(12) United States Patent
Fujita et al.

(10) Patent No.: US 11,648,790 B2
(45) Date of Patent: May 16, 2023

(54) INK JET RECORDING METHOD AND INK SET

(71) Applicant: Seiko Epson Corporation, Tokyo (JP)

(72) Inventors: Kunihiro Fujita, Shiojiri (JP); Ippei Okuda, Shiojiri (JP)

(73) Assignee: SEIKO EPSON CORPORATION

( * ) Notice: Subject to any disclaimer, the term of this patent is extended or adjusted under 35 U.S.C. 154(b) by 253 days.

(21) Appl. No.: 17/084,742

(22) Filed: Oct. 30, 2020

(65) Prior Publication Data
US 2021/0129569 A1 May 6, 2021

(30) Foreign Application Priority Data

Oct. 31, 2019 (JP) .............................. JP2019-198366

(51) Int. Cl.

| | |
|---|---|
| *B41M 5/00* | (2006.01) |
| *C09D 11/54* | (2014.01) |
| *C09D 11/037* | (2014.01) |
| *C09D 11/322* | (2014.01) |
| *C09D 11/108* | (2014.01) |
| *C09D 11/107* | (2014.01) |

(Continued)

(52) U.S. Cl.
CPC ........ *B41M 5/0023* (2013.01); *B41M 5/0017* (2013.01); *C09D 11/037* (2013.01);
(Continued)

(58) Field of Classification Search
CPC ....... C09D 11/322; C09D 11/40; C09D 11/54; B41J 2/2117; B41J 2/2114; B41M 5/0017; B41M 7/00
See application file for complete search history.

(56) References Cited

U.S. PATENT DOCUMENTS

| | | | | |
|---|---|---|---|---|
| 8,215,744 | B2 * | 7/2012 | Yamanobe | ........... B41M 5/0017 |
| | | | | 347/21 |
| 8,817,316 | B2 * | 8/2014 | Yoshida | ................. G06K 15/02 |
| | | | | 358/1.18 |

(Continued)

FOREIGN PATENT DOCUMENTS

| | | |
|---|---|---|
| JP | 2015-147405 A | 8/2015 |
| JP | 2019-064079 A | 4/2019 |
| JP | 2019-147339 A | 9/2019 |

OTHER PUBLICATIONS

BASF Product Selection Guide, Printing & Packaging Industry, Mar. 2018, 15 pages.

*Primary Examiner* — John Zimmermann
(74) *Attorney, Agent, or Firm* — Harness, Dickey & Pierce, P.L.C.

(57) ABSTRACT

An ink jet recording method performs recording on a recording medium using a white ink composition, a non-white ink composition, and a treatment liquid containing an aggregating agent, the method including: a treatment liquid adhesion step of adhering the treatment liquid to the recording medium to form a treatment liquid layer; a non-white ink adhesion step of adhering the non-white ink composition to the recording medium by ejection thereof from an ink jet head to form a non-white ink layer; and a white ink adhesion step of adhering the white ink composition to the recording medium by ejection thereof from an ink jet head to form a white ink layer. The recording medium has a region in which the non-white ink layer, the white ink layer, and the treatment liquid layer are overlapped with each other, at least one of the ink compositions contains resin particles and a water-soluble resin, and the water-soluble resin has a glass transition temperature higher than that of a resin of the resin particles.

13 Claims, 1 Drawing Sheet

(51) Int. Cl.
  *C09D 11/40* (2014.01)
  *C09D 11/12* (2006.01)
  *C09D 11/101* (2014.01)
(52) U.S. Cl.
  CPC .......... *C09D 11/107* (2013.01); *C09D 11/108* (2013.01); *C09D 11/322* (2013.01); *C09D 11/40* (2013.01); *C09D 11/54* (2013.01); *C09D 11/101* (2013.01); *C09D 11/12* (2013.01)

(56) References Cited

U.S. PATENT DOCUMENTS

| | | | |
|---|---|---|---|
| 9,850,391 B2 * | 12/2017 | Fukuoka | C09D 11/326 |
| 10,597,548 B2 | 3/2020 | Mizutani et al. | |
| 11,186,739 B2 | 11/2021 | Ohta | |
| 2006/0158473 A1 * | 7/2006 | Mills | B41J 11/0015 |
| | | | 347/15 |
| 2010/0273897 A1 * | 10/2010 | Göttsche | A01N 43/36 |
| | | | 514/772.4 |
| 2012/0049506 A1 * | 3/2012 | Nikkila | B42D 25/43 |
| | | | 283/85 |
| 2013/0021401 A1 * | 1/2013 | Okuda | B41J 2/2117 |
| | | | 347/15 |
| 2015/0054883 A1 * | 2/2015 | Okuda | C09D 11/54 |
| | | | 524/556 |
| 2015/0197654 A1 | 7/2015 | Okuda et al. | |
| 2017/0021641 A1 * | 1/2017 | Goi | C09D 11/107 |
| 2017/0166767 A1 * | 6/2017 | Watanabe | C09D 11/38 |

* cited by examiner

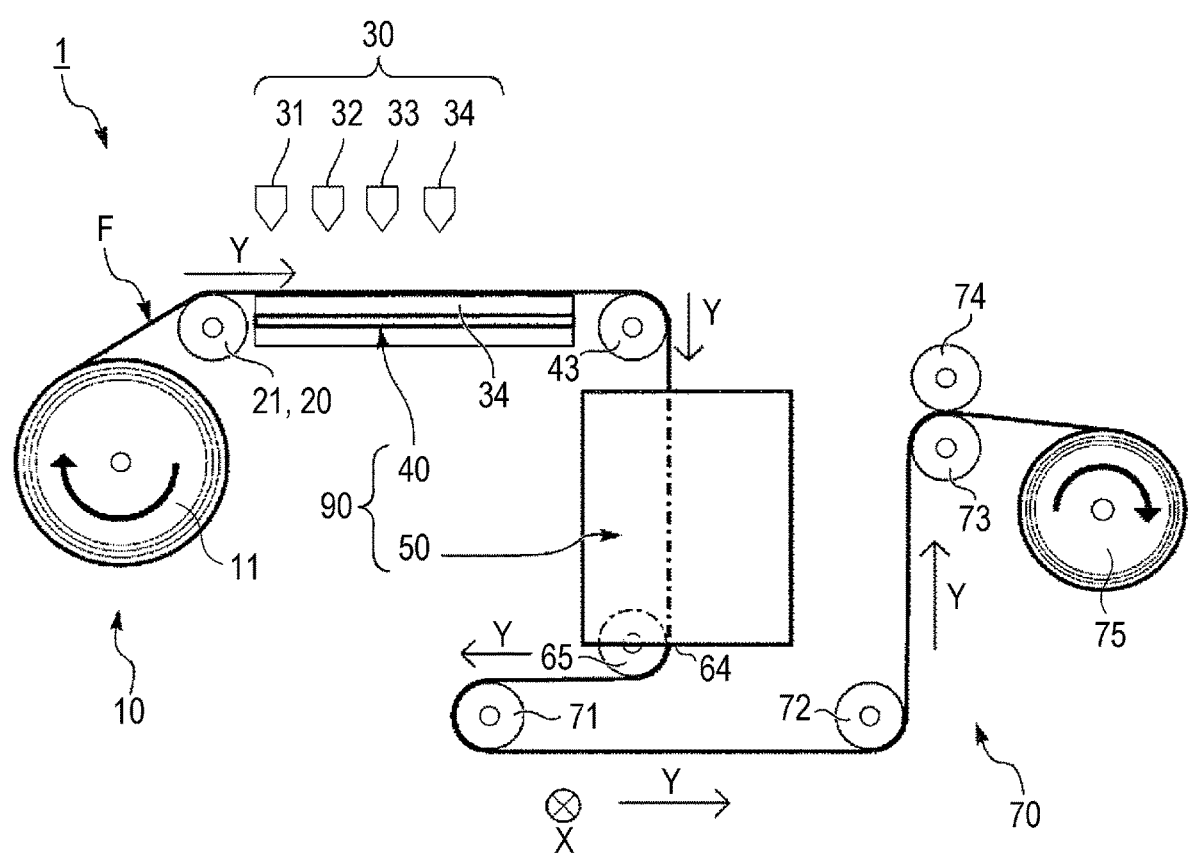

INK JET RECORDING METHOD AND INK SET

The present application is based on, and claims priority from JP Application Serial Number 2019-198366, filed Oct. 31, 2019, the disclosure of which is hereby incorporated by reference herein in its entirety.

BACKGROUND

1. Technical Field

The present disclosure relates to an ink jet recording method and an ink set.

2. Related Art

Since being capable of recording a highly fine image by a relatively simple apparatus, an ink jet recording method has been rapidly developed in various fields. For example, JP-A-2015-147405 has disclosed a recording method in which a treatment liquid containing an aggregating agent to aggregate an ink component and/or to increase its viscosity and an ink are adhered to and overlapped with each other in this order.

As disclosed in JP-A-2015-147405, when a treatment liquid containing an aggregating agent and an ink composition are used, a component, such as a pigment, of the ink composition is aggregated and is rapidly fixed to a recording medium, and hence, an excellent image quality can be obtained. On the other hand, when a white ink composition and a treatment liquid are used for recording, abrasion resistance is liable to be degraded. That is, in order to obtain an image excellent not only in image quality but also in abrasion resistance, an ink jet recording method using a treatment liquid containing an aggregating agent and a white ink composition is still required to be improved.

SUMMARY

In order to solve the problem described above, intensive research was carried out by the present inventors. As a result, in the case in which a region in which a non-white ink layer, a white ink layer, and a treatment liquid layer, each of which is formed by an ink jet recording method, are overlapped with each other is provided; at least one of a white ink composition and a non-white ink composition contains resin particles and a water-soluble resin, or one of the white ink composition and the non-white ink composition contains resin particles, and the other contains a water-soluble resin; and the water-soluble resin has a glass transition temperature higher than that of a resin of the resin particles, it was found that a recorded matter having an image excellent not only in image quality but also in abrasion resistance can be obtained.

That is, the present disclosure is as described below.

According to an aspect of the present disclosure, there is provided an ink jet recording method which performs recording on a recording medium using a white ink composition, a non-white ink composition, and a treatment liquid containing an aggregating agent, the method comprising: a treatment liquid adhesion step of adhering the treatment liquid to the recording medium to form a treatment liquid layer; a non-white ink adhesion step of adhering the non-white ink composition to the recording medium by ejection thereof from an ink jet head to form a non-white ink layer; and a white ink adhesion step of adhering the white ink composition to the recording medium by ejection thereof from an ink jet head to form a white ink layer. In the method described above, the recording medium has a region in which the non-white ink layer, the white ink layer, and the treatment liquid layer are overlapped with each other; at least one of the white ink composition and the non-white ink composition contains resin particles and a water-soluble resin, or one of the white ink composition and the non-white ink composition contains resin particles, and the other contains a water-soluble resin; and the water-soluble resin has a glass transition temperature higher than that of a resin of the resin particles.

According to another aspect of the present disclosure, there is provided an ink set which includes a white ink composition, a non-white ink composition, and a treatment liquid containing an aggregating agent and which is used for a recording method to be performed on a recording medium, the recording method comprising: a treatment liquid adhesion step of adhering the treatment liquid to the recording medium to form a treatment liquid layer; a non-white ink adhesion step of adhering the non-white ink composition to the recording medium by ejection thereof from an ink jet head to form a non-white ink layer; and a white ink adhesion step of adhering the white ink composition to the recording medium by ejection thereof from an ink jet head to form a white ink layer, and the recording medium having a region in which the non-white ink layer, the white ink layer, and the treatment liquid layer are overlapped with each other. In the ink set described above, at least one of the white ink composition and the non-white ink composition contains resin particles and a water-soluble resin, or one of the white ink composition and the non-white ink composition contains resin particles, and the other contains a water-soluble resin; and the water-soluble resin has a glass transition temperature higher than that of a resin of the resin particles.

The white ink composition described above may contain the resin particles and the water-soluble resin. At least one of the white ink composition and the non-white ink composition contains the resin particles ands the water-soluble resin, and the content of the resin particles in the ink composition may be two times or more the content of the water-soluble resin. The water-soluble resin may have a glass transition temperature higher than that of the resin of the resin particles by 10° C. to 100° C. The water-soluble resin may have a glass transition temperature of 90° C. or more, and the resin of the resin particles may have a glass transition temperature of less than 90° C. The resin of the resin particles may include an acrylic resin, and the water-soluble resin may include an urethane resin. The non-white ink composition may include a clear ink composition, and the non-white ink adhesion step may adhere the clear ink composition to the recording medium by ejection thereof from an ink jet head to form a clear ink layer as the non-white ink layer. The aggregating agent contained in the treatment liquid may contain a polyvalent metal salt, an organic salt, or a cationic polymer. In the non-white ink adhesion step or the white ink adhesion step, the recording medium may have a surface temperature of 45° C. or less when the ink composition is adhered thereto. After the treatment liquid adhesion step, the non-white ink adhesion step, and the white ink adhesion step, the method described above further comprises a post-heating step of heating the recording medium, and the recording medium in the post-heating step may have a surface temperature of 90° C. or less. The non-white ink composition may include a non-white color ink composition, and the non-white ink adhesion step may adhere the non-white color ink composition to the recording medium by ejection thereof from an ink jet head to form a non-white color ink layer as the non-white ink layer. On the non-white ink layer formed by the non-white ink adhesion step, the white ink layer may be formed by the white ink adhesion step.

BRIEF DESCRIPTION OF THE DRAWING

FIGURE is a schematic side view showing one example of an ink jet recording apparatus to be used in this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, elements similar or equivalent to each other are designated by the same reference numeral, and duplicated description will be omitted. In addition, the positional relationship, such as top and bottom and/or right and left, is based on the positional relationship shown in the drawing, unless otherwise particularly noted. Furthermore, the dimensional ratio of the drawing is not limited to the ratio shown in the drawing.

An ink jet recording method of this embodiment is a recording method to be performed on a recording medium using a white ink composition, a non-white ink composition, and a treatment liquid (hereinafter, simply referred to as "treatment liquid" in some cases) containing an aggregating agent.

In addition, the recording method of this embodiment includes: a treatment liquid adhesion step of adhering a treatment liquid to a recording medium to form a treatment liquid layer, a non-white ink adhesion step of adhering a non-white ink composition to the recording medium by ejection thereof from an ink jet head to form a non-white ink layer, and a white ink adhesion step of adhering a white ink composition to the recording medium by ejection thereof from an ink jet head to form a white ink layer.

In the ink jet recording method of this embodiment, the recording medium has a region in which the non-white ink layer, the white ink layer, and the treatment liquid layer are overlapped with each other.

In the ink jet recording method of this embodiment, at least one of the white ink composition and the non-white ink composition contains resin particles and a water-soluble resin, or one of the white ink composition and the non-white ink composition contains resin particles, and the other contains a water-soluble resin.

In the ink jet recording method of this embodiment, the water-soluble resin has a glass transition temperature higher than that of a resin of the resin particles.

Since the ink jet recording method of this embodiment has the structure described above, a recorded matter having an image excellent no only in image quality but also in abrasion resistance is obtained.

By the recording method of this embodiment, although the reason the above effect can be obtained has not been clearly understood, the following may be considered. However, the reason may not be limited to those described below.

When the treatment liquid containing an aggregating agent and the ink composition are used, a component, such as a pigment, of the ink composition is aggregated and is rapidly fixed to the recording medium, so that an excellent image quality can be obtained. On the other hand, when the treatment liquid is used, since the component of the ink composition is aggregated, coarse particles are liable to be generated, and irregularities are formed in an image surface, so that the abrasion resistance may be degraded in some cases. When the white ink composition and the treatment liquid are used for recording, in particular, coarse particles are liable to be generated, and the surface of a coating film thus formed may not be sufficiently smoothed in some cases, so that the abrasion resistance is liable to be degraded. As a method to improve the abrasion resistance, for example, although the use of resin particles which fixes an image on a recording medium may be considered for the ink composition, when the water-soluble resin is further contained in the ink composition, and printing is performed using this ink composition, the water-soluble resin also functions as a fixing resin, and the abrasion resistance of the recorded matter is improved.

In addition, while the combination between the resin particles and the water-soluble resin has been investigated, the following two findings were obtained. As the first finding, when particles having a low glass transition temperature are used as the resin particles, the image is likely to be smoothed during heating, and the abrasion resistance of the recorded matter is excellent. As the second finding, since the water-soluble resin is able to smooth an image without heating, when a resin having a high glass transition temperature is used as the water-soluble resin, the abrasion resistance of the recorded matter is excellent. Hence, it was found that when the resin particles and the water-soluble resin are used, and the combination therebetween is selected so that the water-soluble resin has a glass transition temperature higher than that of the resin of the resin particles, a more excellent abrasion resistance can be obtained.

In the following embodiments, definitions of various terms are as described below.

The "layer" in each of the "treatment liquid layer", the "non-white ink layer", and the "white ink layer" indicates one element which forms a laminate. The each layer may be an element, such as a solid image, which is adhered to a continuous region or may be an element, such as dots each formed to have an island shape.

The state of "to be overlapped" or "to overlap" indicates a state in which the layers may be at least partially overlapped with each other on the recording medium.

The "resin particles" indicates a resin which is dispersed in a medium of the ink composition.

The "water-soluble resin" indicates a resin described below. For example, even after the resin is mixed and stirred with water at a concentration of 1 percent by mass at ordinary temperature (25° C.), a whole liquid thus prepared is not clouded, and/or precipitates cannot be observed in this liquid.

Ink Jet Recording Method

The recording method of this embodiment includes the treatment liquid adhesion step of adhering the treatment liquid to the recording medium to form the treatment liquid layer; the non-white ink adhesion step of adhering the non-white ink composition to the recording medium by ejection thereof from an ink jet head to form the non-white ink layer; and the white ink adhesion step of adhering the white ink composition to the recording medium by ejection thereof from an ink jet head to form the white ink layer.

The treatment liquid adhesion step, the non-white ink adhesion step, and the white ink adhesion step may be performed in an arbitrary order in accordance with the recording medium to be used and the application thereof. For example, the treatment liquid adhesion step, the white ink adhesion step, and the non-white ink adhesion step may be performed in this order, or the treatment liquid adhesion step, the non-white ink adhesion step, and the white ink adhesion step may be performed in this order.

As the non-white ink adhesion step, a clear ink adhesion step in which a clear ink composition is adhered to the recording medium by ejection thereof from an ink jet head to form a clear ink layer or a non-white color ink adhesion step in which a non-white color ink composition is adhered to the recording medium by ejection thereof from an ink jet head to form a non-white color ink layer may be included.

On the non-white ink layer formed in the non-white ink adhesion step, the white ink layer is preferably formed in the white ink adhesion step. In addition, the white ink layer is preferably formed directly on the non-white ink layer. Since the layers are formed in the order as described above, the image quality and the abrasion resistance of the recorded matter can be further improved.

As the non-white ink adhesion step, when the ink jet recording method of this embodiment includes the clear ink adhesion step and the non-white color ink adhesion step, the treatment liquid adhesion step, the clear ink adhesion step, the non-white color ink adhesion step, and the white ink adhesion step may be performed in an arbitrary order in accordance with the recording medium to be used and the application thereof. Among the orders described above, the order of the treatment liquid adhesion step, the white ink adhesion step, the non-white color ink adhesion step, and the clear ink adhesion step is preferable.

Hereinafter, as for the ink jet recording method of this embodiment, although the treatment liquid adhesion step, the white ink adhesion step, the non-white color ink adhesion step, and the clear ink adhesion step will be described in this order, the order of the above adhesion steps is not limited thereto.

—Ink Jet Recording Apparatus—

FIG. 1s a schematic side view showing one example of an ink jet recording apparatus 1 to be used for the recording method of this embodiment. As shown in FIGURE, the ink jet recording apparatus 1 includes a feed portion 10 to feed a recording medium, a transport portion 20, a recording portion 30, a drying device 90, and a discharge portion 70. In addition, in the ink jet recording apparatus 1 also includes a pre-heater (not shown), and a recording medium F may be heated in advance before recording.

The drying device 90 includes a first drying portion 40 to perform a drying step to dry the recording medium and a second drying portion 50 to dry a recorded matter obtained by the recording method according to this embodiment. The second drying portion 50 includes a heater to heat the recording medium. The heater of the drying device 90 may be either a contactless type heater or a contact type heater.

The feed portion 10 is provided so as to feed the recording medium F to the transport portion 20. In particular, the feed portion 10 includes a roll medium holder 11, and the roll medium holder 11 holds the recording medium F. In addition, the roll medium holder 11 is formed such that by the rotation thereof, the recording medium F is fed to the transport portion 20 located downstream in a feed direction Y. In addition, the recording medium F is not limited to have a roll shape.

Furthermore, the transport portion 20 is provided so as to transport the recording medium F fed from the feed portion 10 to the recording portion 30. In particular, the transport portion 20 has a first feed roller 21 and is configured so that the recording medium F thus fed can be further transported to the recording portion 30 located downstream in the feed direction Y.

The recording portion 30 is provided such that the treatment liquid is adhered to the recording medium F transported from the transport portion 20, and the ink composition is then ejected for recording. In particular, the recording portion 30 includes a head 31 to perform the treatment liquid adhesion step, a head 32 to perform the white ink adhesion step, a head 33 to perform the non-white color ink adhesion step, a head 34 to perform the clear ink adhesion step, and a platen 35 as a medium support portion. The sequence of the head 31 to perform the treatment liquid adhesion step, the head 32 to perform the white ink adhesion step, and the head 33 to perform the non-white color ink adhesion step may be appropriately changed in accordance with a process sequence of the ink jet recording method of this embodiment. Although the number of heads 33 to perform the non-white color ink adhesion step is one in FIGURE, when at least two types of non-white color inks are used, at least two heads may also be used. In this case, for example, when the recording apparatus is a line printer or a serial printer, along the transport direction of the recording medium, at least two heads may be sequentially provided. Alternatively, when the recording apparatus is a serial printer, in a front-to-rear direction to the plane of the drawing, at least two heads may be sequentially provided.

In addition, a treatment liquid adhesion method is not limited to an ink jet method, and in particular, the treatment liquid may be adhered by roller coating, spray coating, or the like. Since the amount and the position of the treatment liquid to be adhered can be highly precisely controlled, an ink jet method is preferable.

The ink jet recording apparatus 1 may be a line printer which uses line heads as the heads and which is operated by a line recording method to perform recording by one scanning on a recording medium to be transported. The line head is an ink jet head having a length larger than a recording width of the recording medium. Alternatively, the ink jet recording apparatus 1 may be a serial printer operated by a serial recording method to perform recording such that a main scanning in which an ink is adhered to a recording medium while each head is transferred with respect to a recording medium in the front-to-rear direction to the plane of the drawing and a sub-scanning in which the recording medium is transported are alternately and repeatedly performed.

The platen 35 is provided to support the recording medium F from a rear surface side thereof. In addition, the platen 35 is provided with the first drying portion 40 to dry the treatment liquid and the ink compositions adhered to the recording medium F. Furthermore, at downstream than the platen 35 in the feed direction Y, a second feed roller 43 is provided. In addition, the second feed roller 43 is configured so that the recording medium F thus recorded is fed to the second drying portion 50 located downstream in the feed direction Y.

The second drying portion 50 is configured so as to further dry the treatment liquid and the ink compositions adhered to the recording medium F. Furthermore, in the vicinity of an outlet 64 of the second drying portion 50, a third feed roller 65 is provided. The third feed roller 65 is disposed so as to be in contact with the rear surface of the recording medium F and is configured to feed the recording medium F to the discharge portion 70 located downstream in the feed direction Y.

Furthermore, the discharge portion 70 is provided such that the recording medium F fed from the second drying portion 50 is further fed downstream in the feed direction Y and is discharged outside of the ink jet recording apparatus 1. In particular, the discharge portion 70 includes a fourth feed roller 71, a fifth feed roller 72, a sixth feed roller 73, a seventh feed roller 74, and a winding roller 75. Among those rollers, the fourth feed roller 71 and the fifth feed roller 72 are each disposed so as to be in contact with the recording medium F. In addition, the sixth feed roller 73 and the seventh feed roller 74 are disposed so as to form a roller pair. In addition, the winding roller 75 is provided so as to wind the recording medium F discharged by the sixth feed roller 73 and the seventh feed roller 74.

Hereinafter, various materials to be used for the ink jet recording method of this embodiment will be described in detail.

—Ink Composition—

The ink jet recording method of this embodiment uses, as the ink composition, the white ink composition and the non-white ink composition. In addition, in this embodiment, at least one of the white ink composition and the non-white ink composition contains the resin particles and the water-soluble resin, or one of the white ink composition and the non-white ink composition contains the resin particles, and the other contains the water-soluble resin. That is, the resin particles are contained in at least one of the white ink composition and the non-white ink composition, and the water-soluble resin is contained in at least one thereof. Since the ink compositions contain the resin particles and the water-soluble resin as described above, a recorded matter excellent in abrasion resistance can be obtained. The resin particles and the water-soluble resin may be independently contained in any one of the ink compositions. When irregularities caused by the formation of the white ink layer can be smoothed by the layers which are formed by the ink jet recording method of this embodiment so as to be overlapped with each other, the resin particles and the water-soluble resin may be contained in any one of the ink compositions.

As the non-white ink composition, for example, there may be mentioned the non-white color ink composition and the clear ink composition. Any one of those ink compositions may be used, or the two thereof may also be used.

In addition, the water-soluble resin is a resin dissolved in a medium of the ink composition and is not a resin to function as a pigment dispersant. Even when the water-soluble resin is contained in an ink composition other than the white ink composition, if this ink composition is recorded so as to be overlapped with the white ink composition, the abrasion resistance of the recorded matter can be further improved. However, the water-soluble resin is preferably likely to be present in the same layer as that of components of the white ink composition, and the white ink composition preferably contains the water-soluble resin. An ink composition which contains the water-soluble resin is preferably recorded so as to be overlapped with the white ink composition, and the clear ink composition is likely to be recorded so as to be overlapped with the white ink composition. When the non-white color ink composition contains the water-soluble resin, and from a design point of view, when a region in which the white ink layer is only present is provided on the recording medium, the non-white color ink layer may be additionally provided at a side of the recorded matter opposite to a side at which the white ink layer is viewed and used so as to be overlapped with the white ink composition for recording.

From a point different from that described above, since at least one of the ink compositions contains the resin particles and the water-soluble resin, the recorded matter obtained by the ink jet recording method of this embodiment can be suppressed from being cracked. Heretofore, in the case in which the white ink composition and the non-white ink composition are printed to be laminated to each other so that the recorded matter has a region in which the non-white ink layer and the white ink layer are overlapped with each other, when the ink compositions are dried after recording, the ink laminate film is disadvantageously liable to be cracked. The crack problem described above becomes serious, in particular, when the treatment liquid is used. The reason for this is believed that since the ink composition reacts with the treatment liquid, the component in the ink composition is aggregated and is formed into coarse particles, and the particles may cause the cracks during drying to be performed after the recording. In addition, since the cracks are generated when the white ink composition and the non-white ink composition form a laminate film, it is believed that when the components of the ink layers thus laminated are different from each other, the cracks are generated. It was found that when the water-soluble resin is contained in the ink composition, the generation of cracks in the recorded matter can be suppressed. The reason for this is believed that during the thermal contraction, an effect to suppress the generation of cracks of the white ink layer and the non-white ink layer is obtained. In addition, since the drying after the recording can be performed at a lower temperature and/or for a shorter time, the generation of cracks can be advantageously suppressed.

In the ink jet recording method of this embodiment, the water-soluble resin has a glass transition temperature higher than that of the resin of the resin particles. Since the glass transition temperatures of the water-soluble resin and the resin particles have a relationship in the range as described above, the recorded matter excellent in abrasion resistance can be obtained.

The water-soluble resin has a glass transition temperature higher than the glass transition temperature of the resin of the resin particles by preferably 5° C. or more and more preferably 10° C. or more. In addition, the water-soluble resin has a glass transition temperature higher than the glass transition temperature of the resin of the resin particles by preferably 10° C. to 100° C., more preferably 20° C. to 80° C., and further preferably 30° C. to 60° C. Since the glass transition temperatures of the water-soluble resin and the resin of the resin particles have the relationship in the range as described above, the abrasion resistance of the recorded matter can be further improved. In addition, when a plurality of water-soluble resins and/or a plurality of resin particles are used in the ink compositions for the ink jet recording method of this embodiment, the difference in glass transition temperature between the water-soluble resin and the resin particles may be satisfied in the range as described above by at least one of combinations among those mentioned above. Furthermore, when the plurality of water-soluble resins and/or the plurality of resin particles are used, among the number of combinations between the water-soluble resin and the resin particles to be used, in one fourth or more of the combinations, the relationship in the above range is more preferably satisfied. Among the number of combinations described above, the relationship in the above range is satisfied further preferably in one half or more of the combinations, and even further preferably in two third or more of the combinations. Furthermore, in all the combinations between the water-soluble resin and the resin particles to be used, the relationship in the above range is particularly preferably satisfied.

The glass transition temperatures of the water-soluble resin and the resin of the resin particles each can be measured by a differential scanning calorimeter (DSC) in accordance with JIS K7121: 1987. As a commercial product of the differential scanning calorimeter (DSC), for example, "DSC6220" (product name, manufactured by Seiko Denshi Kogyo Co., Ltd.) may be mentioned.

—Resin Particles—

The resin particles according to this embodiment contain a resin. Since the resin particles are used, as the ink composition is dried, the resin particles and other components, such as a colorant, are fused to each other and fixed to the recording medium, and hence, the abrasion resistance of an image of the recorded matter can be further improved. Although the resin of the resin particles are not particularly limited, for example, there may be mentioned an acrylic resin, an urethane resin, an olefinic resin, a vinyl chloride resin, a vinyl alcohol resin, a vinyl ether resin, a vinyl pyrrolidone resin, a vinyl pyridine resin, a vinyl carbazole resin, a vinyl imidazole resin, a vinylidene chloride resin, or a fluorine resin. Among those resins mentioned above, an acrylic resin or an urethane resin is preferable, and an acrylic resin is more preferable. The acrylic resin may also be a copolymer of an acrylic monomer and a vinyl monomer and, for example, may be an acryl-styrene resin. The urethane resin is a resin having many urethane structures in its molecule. In addition, an urethane resin which is prepared using an acrylic monomer is classified in the urethane resin.

The resin particles according to this embodiment are preferably resin particles of a resin emulsion. The resin emulsions may be used alone, or at least two types thereof may be used in combination. As the resin emulsion, an emulsion obtained from known materials by a known production method may be used, or a commercially available product may also be used. Although the commercially available product of the resin emulsion is not particularly limited, for example, there may be mentioned Movinyl 966A (product name, manufactured by The Nippon Synthetic Chemical Industry Co., Ltd., acrylic resin emulsion); Microgel E-1002 or Microgel E-5002 (product name, manufactured by Nippon Paint Co., Ltd.); Boncoat 4001 or Boncoat 5454 (product name, manufactured by DIC Corporation); SAE1014 (trade name, Zeon Corporation); Saivinol SK-200 (product name, manufactured by Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, or Joncryl 7610 (product name, manufactured by BASF); or NK Binder-R-SHN (product name, manufactured by Shin-Nakamura Chemical Co., Ltd., acrylic emulsion, solid content: 44%).

The glass transition temperature of the resin of the resin particles is preferably −30° C. or more, and in order to improve a cracking resistance, the glass transition temperature thereof is more preferably 20° C. or more and further preferably 40° C. or more. In addition, in order to further improve the abrasion resistance, the glass transition temperature described above is further preferably 50° C. or more and even further preferably 60° C. or more. The glass transition temperature described above is preferably 120° C. or less, and in order to further improve the abrasion resistance of the recorded matter, the glass transition temperature described above is more preferably less than 90° C. and further preferably 80° C. or less.

As the resin particles, a commercially available product may also be used. In this case, the glass transition temperature is measured by the method described above, and a product having a desired glass transition temperature may be selected. Alternatively, the resin particles may be prepared by polymerization using a known method. In this case, for example, emulsion polymerization or solution polymerization may be used. When the resin particles are prepared by polymerization, in consideration of the glass transition temperatures of polymers obtained from monomers to be used, the types of monomers and a composition rate therebetween may be appropriately adjusted. After the glass transition temperature is measured by the method described above, the types of monomers and the composition rate therebetween are adjusted to obtain a desired glass transition temperature and may be fed back for the following polymerization.

The volume average particle diameter of the resin particles is preferably 10 to 300 nm, more preferably 20 to 200 nm, and further preferably 50 to 150 nm. The volume average particle diameter may be measured by a particle size distribution measurement apparatus using a dynamic light scattering method as a measurement principle. As the particle size distribution measurement apparatus described above, for example, "Nanotrack" Series (trade name) manufactured by MicrotracBEL Corp. may be mentioned. The volume average particle diameter is a value represented by $D_{50}$.

The weight average molecular weight of the resin of the resin particles is preferably 10,000 to 300,000 and more preferably 20,000 to 200,000. The number average molecular weight of the resin of the resin particles is preferably 10,000 to 300,000 and more preferably 20,000 to 200,000. When the average particle diameters are in the ranges described above, the abrasion resistance is preferably more excellent.

The content of the resin particles with respect to the total mass of the ink composition is preferably 1.0 to 15.0 percent by mass, more preferably 2.0 to 10.0 percent by mass, and further preferably 3.0 to 8.0 percent by mass. The content described above indicates the content of the resin particles in one type of ink composition. Since the content is in the range described above, for example, the abrasion resistance of the recorded matter can be further improved.

When the resin particles are contained in at least two types of ink compositions, the total content of the resin particles with respect to the total mass of the ink compositions each containing the resin particles is preferably 1.0 to 15.0 percent by mass, more preferably 2.0 to 10.0 percent by mass, and further preferably 2.5 to 8.0 percent by mass. The total content described above indicates the total content of the resin particles with respect to the total mass of the ink compositions each containing the resin particles among the ink compositions to be used in the ink jet recording method of this embodiment. Since the total content is in the range described above, for example, the abrasion resistance of the recorded matter can be further improved.

—Water-Soluble Resin—

In the ink composition used in this embodiment, the water-soluble resin is contained. Although the water-soluble resin is not particularly limited, for example, there may be mentioned a water-soluble acrylic resin, a water-soluble styrene-acrylic resin, a water-soluble acrylonitrile-acrylic resin, a water-soluble vinyl acetate-acrylic resin, a water-soluble polyurethane resin, or a water-soluble polyester resin. Among those resins mentioned above, a water-soluble acrylic resin, a water-soluble polyurethane resin, or a water-soluble polyester resin is preferably, and a water-soluble acrylic resin is more preferable. In addition, as the acrylic resin, a copolymer of an acrylic monomer and a vinyl monomer may be used, and for example, a styrene-acrylic resin may also be used.

Since having many hydrophilic structures in its molecule, the water-soluble resin preferably has water solubility. As the hydrophilic structure, for example, a hydroxy group, a polyalkylene group, a carboxy group, or a salt thereof may be mentioned.

The water-soluble acrylic resin is preferably a copolymer resin formed from a copolymerizable monomer, such as acrylic acid, methacrylic acid, or itaconic acid, having an acid group. The copolymer resin is preferably a copolymer formed from one of the following three types of monomers.
  a) monomer having an acid group
  b) monomer which forms a homopolymer having a Tg of 100° C. or more
  c) monomer which forms a homopolymer having a Tg of 30° C. or less In order to enhance the water solubility of the above copolymer, the acid groups thereof are preferably partially or entirely neutralized with a basic substance. Although the basic substance is not particularly limited, for example, there may be mentioned an alkali metal-containing basic substance, such as sodium hydroxide or potassium hydroxide, or a nitrogen-containing basic substance, such as ammonia, an alkanolamine, or an alkylamine. Among those mentioned above, a nitrogen-containing basic substance is preferable.

The boiling point (at 1 atom) of the nitrogen-containing basic substance is preferably 200° C. or less and more preferably 180° C. or less. Since a nitrogen-containing basic substance having a boiling point in the range as described above is used for neutralization, a more excellent image quality can be obtained.

The water-soluble resin is preferably a resin which contains acrylic acid or methacrylic acid as a copolymerizable monomer and which is partially or entirely neutralized with ammonia.

The water-soluble polyurethane resin is a resin having many urethane structures in its molecule. As the water-soluble polyurethane resin, a resin prepared so as to have the hydrophilic structures as described above may be used. In addition, a polyurethane resin which is prepared using an acrylic monomer is also called a polyurethane resin.

The weight average molecular weight of the water-soluble resin is preferably 10,000 to 300,000 and more preferably 20,000 to 200,000. The number average molecular weight of the water-soluble resin is preferably 10,000 to 300,000 and more preferably 20,000 to 200,000. When the average molecular weights are in the ranges described above, it is preferable since the abrasion resistance or the like is more excellent.

The glass transition temperature of the water-soluble resin is preferably 90° C. or more, more preferably 100° C. or more, and further preferably 105° C. or more. The glass transition temperature described above is preferably 200° C. or less, more preferably 180° C. or less, and further preferably 150° C. or less. A measurement method of the glass transition temperature of the water-soluble resin is similar to that of the resin described above.

As is the resin particles described above, as the water-soluble resin, a commercially available product may be used, and a resin prepared by polymerization using a known method may also be used. In addition, as is the case described above, a water-soluble resin having a desired glass transition temperature may also be obtained.

The content of the water-soluble resin with respect to the total mass of the ink composition is preferably 0.1 to 15.0 percent by mass, more preferably 0.5 to 10.0 percent by mass, and further preferably 1.0 to 5.0 percent by mass. The content described above indicates the content of the water-soluble resin in one type of ink composition. Since the content described above is in the above range, the abrasion resistance of the recorded matter can be further improved.

When at least two types of ink compositions each containing the water-soluble resin are used, the total content of the water-soluble resins with respect to the total mass of the ink compositions is preferably 0.1 to 15.0 percent by mass, more preferably 0.5 to 10.0 percent by mass, and further preferably 0.8 to 8.0 percent by mass. The content described above also indicates the content of the water-soluble resin with respect to the total mass of the ink compositions each containing the water-soluble resin. When the content described above is in the above range, the abrasion resistance of the recorded matter can be further increased.

The total content of the resin particles and the water-soluble resin is preferably 1.1 percent by mass or more, more preferably 2.0 percent by mass or more, and further preferably 3.0 percent by mass or more. Since the total content described above is the above lower limit or more, the image quality and the abrasion resistance of the recorded matter can be further improved. The total content of the resin particles and the water-soluble resin is preferably 30.0 percent by mass or less, more preferably 20.0 percent by mass or less, further preferably 10.0 percent by mass or less, and even further preferably 8.0 percent by mass or less. Since the total content described above is the above upper limit or less, a clogging resistance of the ink composition can be further improved.

The total content of the resin particles and the water-soluble resins is the total of the contents of the resin particles with respect to the total mass of the ink compositions each containing the resin particles and the contents of the water-soluble resins with respect to the total mass of the ink compositions each containing the water-soluble resin.

In the ink composition to be used in the ink jet recording method of this embodiment, the total of the contents of the resin particles of the ink compositions each containing the resin particles with respect to the total of the contents of the water-soluble resins of the ink compositions each containing the water-soluble resin is preferably two times or more, more preferably three times or more, and further preferably four times or more. When the total of the contents of the resin particles is in the range described above, the abrasion resistance of the recorded matter can be further improved. Although not particularly limited, the upper limit is preferably 15 times or less, more preferably 10 times or less, and further preferably 5 times or less.

The ratio of the total of the contents of the resin particles/ the total of the contents of the water-soluble resins described above is preferably 30/70 to 95/5, more preferably 50/50 to 90/10, and further preferably 60/40 to 85/15. When the ratio described above is in the above range, the abrasion resistance of the recorded matter can be further improved.

In addition, when the ink composition contains the resin particles and the water-soluble resin, in this ink composition, the total of the content of the resin particles and the content of the water-soluble resin is preferably in the range described above. In addition, in the ink described above, the content of the resin particles with respect to the content of the water-soluble resins is also preferably in the range described above.

In the cases described above, when the resin particles and the water-soluble resin in the above ranges are contained in the same ink composition, the resin particles and the water-soluble resin are likely to be present at the same position in the layer in the above mass ratio range, and in particular, the above effect can be preferably easily obtained. Furthermore, the ink composition containing the resin particles and the water-soluble resin may be either the non-white ink composition or the white ink composition, and when the ink composition is the white ink composition, in the ink layer, the resin particles and the water-soluble resin are likely to be present at a position close to the other components of the white ink; hence, in particular, the effect described above is preferably easily obtained.

—Surfactant—

The ink composition used in the ink jet recording method of this embodiment preferably contains a surfactant. Although the surfactant is not particularly limited, for example, an acetylene glycol surfactant, a fluorine surfactant, or a silicone surfactant may be mentioned. Among those mentioned above, since being excellent in wet spreadability of an ink or the like to a recording medium, a fluorine surfactant or a silicone surfactant is preferable.

Although the acetylene glycol surfactant is not particularly limited, for example, there may be mentioned 2,4,7,9-tetramethyl-5-decyne-4,7-diol or an alkylene oxide adduct thereof, or 2,4-dimethyl-5-decyne-4-ol or an alkylene oxide adduct thereof. Although a commercially available product of the acetylene glycol surfactant is not particularly limited, for example, there may be mentioned Olfine 104 Series or E series, such as Olfine E1010 (trade name, manufactured by Air Products and Chemicals, Inc.) or Surfynol 465 or Surfynol 61 (trade name, manufactured by Nisshin Chemical Industry Co., Ltd.). The acetylene glycol surfactants may be used alone, or at least two types thereof may be used in combination.

Although the fluorine surfactant is not particularly limited, for example, there may be mentioned a perfluoroalkylsulfonate salt, a perfluoroalkylcarbonate salt, a perfluoroalkylphosphorus salt, a perfluoroalkyl ethylene oxide adduct, a perfluoroalkyl betaine, or a perfluoroalkyl amine oxide compound. Although a commercially available product of the fluorine surfactant is not particularly limited, for example, there may be mentioned S-144 or S-145 (product name, manufactured by AGC Inc.); FC-170C, FC-430, or Fluorad FC4430 (product name, manufactured by Sumitomo 3M Limited); FSO, FSO-100, FSN, FSN-100, or FS-300 (product name, manufactured by DuPont); or FT-250 or 251 (product name, manufactured by Neos Co., Ltd.). The fluorine surfactants may be used alone, or at least two types thereof may be used in combination.

Although the silicone surfactant is not particularly limited, for example, there may be mentioned a polysiloxane compound or a polyether modified organosiloxane. Although a commercially available product of the silicone surfactant is not particularly limited, for example, there may be mentioned BYK-306, BYK-307, BYK-333, BYK-341, BYK-345, BYK-346, BYK-347, BYK-348, or BYK-349 (product name, manufactured by BYK-Chemie); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (product name, manufactured by Shin-Etsu Chemical Co., Ltd.).

The content of the surfactant with respect to the total mass of each ink composition is preferably 0.1 to 5.0 percent by mass and more preferably 0.1 to 3.0 percent by mass. Since the content of the surfactant is in the range described above, the wettability of the ink composition adhered to the recording medium tends to be further improved.

—Recording Medium—

Although the recording medium in the ink jet recording method of this embodiment may be any one of a non-absorptive recording medium, a low-absorptive recording medium, and an absorptive recording medium, a non-absorptive recording medium or a low-absorptive recording medium is preferable. The absorptive recording medium is inferior in terms of water resistance, abrasion resistance, and the like, and when the absorptive recording medium is formed using an ink receiving layer as a surface layer, the cost may be disadvantageously increased in some cases. On the other hand, the non-absorptive recording medium and the low-absorptive recording medium are each superior in terms of water resistance, abrasion resistance, and cost as compared to those of the absorptive recording medium formed using an ink receiving layer as a surface layer.

In this embodiment, the "low-absorptive recording medium" and the "non-absorptive recording medium" each indicate a recording medium having a water absorption amount of 10 mL/m$^2$ or less for 30 milli seconds from a contact start in accordance with Bristow method. This Bristow method is a most popular method as a method for measuring a liquid absorption amount in a short period and has been employed by Japan Technical Association of the Pulp and Paper Industry (TAPPI). The details of the test method has been disclosed in Standard No. 51 "Paper and Paperboard-Liquid Absorption Test Method-Bristow Method", JAPAN TAPPI PAPER AND PULP TEST METHODS, 2000.

Although the low-absorptive recording medium is not particularly limited, for example, there may be mentioned coated paper having a coating layer to receive an oil based ink as a surface layer. In particular, paper having improved fine appearance and smoothness by applying paint to its surface may be mentioned and is categorized in coated printing paper by "Current Production Survey" of Ministry of Economy, Trade and Industry. As the paint, for example, there may be mentioned a paint formed by mixing a white pigment which is an inorganic compound, such as calcium carbonate or clay including kaolin, and an adhesive such as a starch. The application amount of the paint is preferably approximately 10 to 40 g/m$^2$. Although the coated paper is not particularly limited, for example, there may be mentioned recording paper, such as art paper, coated paper, matte paper, or cast paper.

Although the non-absorptive recording medium is not particularly limited, for example, there may be mentioned a plastic film having no ink absorbing layer, a recording medium having a surface on which a plastic is coated, a recording medium having a surface on which a plastic film is adhered, a metal plate formed, for example, of iron, silver, copper, or aluminum, or glass.

Although the plastic described above is not particularly limited, for example, there may be mentioned a poly(vinyl chloride), a poly(ethylene terephthalate), a polycarbonate, a polystyrene, a polyurethane, a polyethylene, a polypropylene, or a polyacrylic resin.

Hereinafter, the steps of the ink jet recording method of this embodiment will be described in detail.

—Treatment Liquid Adhesion Step—

The treatment liquid adhesion step is a step of adhering the treatment liquid containing an aggregating agent to the recording medium to form the treatment liquid layer. Although an adhesion method is not particularly limited, for example, roller coating, spray coating, or ink jet coating may be used. In addition, the ink jet recording method of this embodiment may further includes a step of, during or after the treatment liquid adhesion step, drying at least a part of the treatment liquid adhered to the recording medium.

The adhesion amount of the treatment liquid per unit area in a region (hereinafter, referred to as "adhesion region of the treatment liquid" in some cases) on the recording medium to which the treatment liquid is adhered is preferably 1 to 10 mg/inch$^2$ and more preferably 1 to 7 mg/inch$^2$. Hereinafter, in each embodiment, this adhesion amount is also simply called "adhesion amount of the treatment liquid" in some cases. Since the adhesion amount of the treatment liquid is in the range described above, the image quality of a recorded matter to be obtained tends to be improved.

The adhesion amount of the treatment liquid with respect to the total of all the ink compositions is preferably 1 to 50 percent by mass, more preferably 5 to 40 percent by mass, and further preferably 10 to 30 percent by mass. Since the adhesion amount of the treatment liquid is in the range described above, the image quality of the recorded matter to be obtained tends to be further improved.

The adhesion amount of the aggregating agent contained in the treatment liquid per unit area of the adhesion region of the treatment liquid is preferably $3\times10^{-5}$ to $150\times10^{-5}$ mmol/inch$^2$, more preferably $5\times10^{-5}$ mmol/inch$^2$ or more, further preferably $10\times10^{-5}$ mmol/inch$^2$ or more, and even further preferably $20\times10^{-5}$ mmol/inch$^2$ or more. The adhesion amount described above is preferably $100\times10^{-5}$ mmol/inch$^2$ or less, more preferably $80\times10^{-5}$ mmol/inch$^2$ or less, further preferably $50\times10^{-5}$ mmol/inch$^2$ or less, and even further preferably $40\times10^{-5}$ mmol/inch$^2$ or less. Since the adhesion amount described above is in the range described above, the image quality of the recorded matter is further improved.

—Treatment Liquid—

The treatment liquid contains the aggregating agent. Since the treatment liquid contains the aggregating agent, although heating is not performed, the pigments contained in the white ink composition and the non-white color ink composition can be rapidly aggregated, and aggregation irregularities of the white ink composition and the non-white color ink composition can be prevented, so that a recorded matter excellent in image quality can be obtained.

—Aggregating Agent—

Although the aggregating agent is not particularly limited, for example, a polyvalent metal salt, an organic acid, or a cationic polymer may be mentioned.

—Polyvalent Metal Salt—

Although the polyvalent metal salt is not particularly limited, for example, a polyvalent metal salt of an acid may be mentioned.

Although the polyvalent metal salt is not particularly limited, for example, there may be mentioned a salt of an alkali earth metal, such as magnesium or calcium, of Group 2 in the periodic table; a transition metal, such as titanium or zirconium, of Group 3 in the periodic table; an earth metal, such as aluminum, of Group 13 in the periodic table; or a lanthanoid, such as lanthanum or neodymium. Among those salts mentioned above, the salt of the metal of Group 2 in the periodic table is preferable, a calcium salt or a magnesium salt is more preferable, and a calcium salt is further preferable.

Although the acid forming a salt with a polyvalent metal is not particularly limited, for example, there may be mentioned carboxylic acid, sulfuric acid, nitric acid, hydrogen chloride, or hydrogen thiocyanate. Although the carboxylic acid is not particularly limited, for example, there may be mentioned formic acid, acetic acid, propionic acid, or benzoic acid. Among those mentioned above, a carboxylic acid or nitric acid is preferable, acetic acid, propionic acid, or nitric acid is more preferable, and propionic acid or nitric acid is further preferable.

Among those polyvalent salts, for example, there may be mentioned a calcium salt or a magnesium salt of a carboxylic acid; a calcium salt or a magnesium salt of sulfuric acid; a calcium salt or a magnesium salt of nitric acid; calcium chloride or magnesium chloride; or a calcium salt or a magnesium salt of hydrogen thiocyanate. The polyvalent metal and the organic acid or the inorganic acid, which collectively form a polyvalent metal salt, may be used in an arbitrary combination and may also form a hydrate. In addition, the polyvalent metal salts may be used alone, or at least two types thereof may be used in combination.

—Organic Acid—

Although the organic acid is not particularly limited, for example, there may be mentioned oxalic acid, malonic acid, succinic acid, citric acid, or acetic acid. Among those organic acids, a monovalent or a divalent carboxylic acid is preferable. In addition, the organic acids may be used alone, or at least two types thereof may be used in combination.

In addition, the organic acid may be in the form of salt. However, an organic acid salt which is also a polyvalent metal slat is regarded as the polyvalent metal salt. Although the organic acid salt is not particularly limited, for example, a monovalent metal salt of the above organic acid may be mentioned. As the metal salt, for example, there may be mentioned an alkali metal salt, such as a sodium salt or a potassium salt, of Group 1 of the periodic table. Although the salt of the organic acid is not particularly limited, for example, sodium acetate may be mentioned. In addition, the organic acid salts may be used alone, or at least two types thereof may be used in combination.

—Polymer—

Although the polymer is not particularly limited, for example, a cationic polymer may be mentioned. Although the cationic polymer is not particularly limited, for example, an amine polymer may be mentioned. The amine polymer may be a resin having an amino group in its structure. As the amine resin, an amine polymer, such as an amine/epichlorohydrin condensed polymer, a polyallylamine, or a polyallylamine derivative, may be mentioned. As the cationic polymer, a resin dissolvable in the treatment liquid or a resin dispersible in the treatment liquid in a resin emulsion state or the like is preferable, and the former is more preferable.

The content of the aggregating agent in the treatment liquid with respect to the total mass of the treatment liquid is preferably 0.1 to 30.0 percent by mass. The content of the aggregating agent is more preferably 1.0 percent by mass or more, further preferably 5.0 percent by mass or more, and even further preferably 10.0 percent by mass or more. The content of the aggregating agent is more preferably 25.0 percent by mass or less and further preferably 20.0 percent by mass or less. Since the content of the aggregating agent is in the range described above, the image quality of the recorded matter to be obtained can be further improved.

—Surfactant—

The treatment liquid may contain a surfactant. Although the surfactant contained in the treatment liquid is not particularly limited, for example, there may be mentioned a nonionic surfactant, an anionic surfactant, or a cationic surfactant. Among those mentioned above, a nonionic surfactant is preferable.

The content of the surfactant in the treatment liquid with respect to the total mass of the treatment liquid is preferably 0.1 to 3.0 percent by mass, more preferably 0.2 to 2 percent by mass, and further preferably 0.3 to 1.5 percent by mass. Since the content of the surfactant is in the range described above, the wettability of the treatment liquid tends to be further improved.

—Defoaming Agent—

The treatment liquid may contain a defoaming agent. Although the defoaming agent is not particularly limited, for example, there may be mentioned a silicone defoaming agent, a polyether defoaming agent, a fatty acid ester defoaming agent, or an acetylene glycol defoaming agent. As a commercially available product of the defoaming agent, for example, BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, or BYK-1770 (product name, manufactured by BYK Japan KK); Surfynol DF37, DF110D, DF58, DF75, DF220, MD-20, or EnviroGem ADO1 (product name, manufactured by Nisshin Chemical Industry Co., Ltd.). The defoaming agents may be used alone, or at least two types thereof may be used in combination.

The content of the defoaming agent in the treatment liquid with respect to the total mass of the treatment liquid is preferably 0.03 to 0.7 percent by mass, more preferably 0.05 to 0.5 percent by mass, and further preferably 0.08 to 0.3 percent by mass.

—Water—

The treatment liquid preferably contains water. As the water, for example, there may be mentioned purified water, such as ion-exchanged water, ultrafiltration water, reverse osmosis water, or distilled water, or water, such as ultrapure water, from which ionic impurities are removed as much as possible. In addition, when water sterilized by ultraviolet radiation or addition of hydrogen peroxide is used, generation of fungi and/or bacteria can be prevented when the treatment liquid is stored for a long time. As a result, the storage stability tends to be further improved.

The content of the water in the treatment liquid with respect to the total mass of the treatment liquid is preferably 55 to 99 percent by mass, more preferably 60 to 90 percent by mass, and further preferably 65 to 80 percent by mass. The treatment liquid is preferably an aqueous treatment liquid, and the "aqueous" indicates a composition in which the content of the water in the composition is 40 percent by mass or more.

—Organic Solvent—

The treatment liquid preferably contains an organic solvent. Although the organic solvent is not particularly limited, for example, there may be mentioned an alcohol, a glycol, or a nitrogen-containing organic solvent. Although the alcohol and the glycol are not particularly limited, for example, there may be mentioned glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-isopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, or tert-pentanol. Although the nitrogen-containing organic solvent is not particularly limited, for example, there may be mentioned N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, or 1,1,3,3-tetramethyl urea. Among those mentioned above, 1,2-hexanediol, triethylene glycol monobutyl ether, or dipropylene glycol monopropyl ether is preferable. In addition, as the organic solvent, a volatile water-soluble organic solvent is more preferable. The organic solvents may be used alone, or at least two types thereof may be used in combination.

The content of the organic solvent in the treatment liquid with respect to the total mass of the treatment liquid is preferably 1 to 40 percent by mass, more preferably 3 to 20 percent by mass, and further preferably 5 to 10 percent by mass.

—White Ink Adhesion Step—

The white ink adhesion step is a step of adhering the white ink composition to the recording medium by ejection thereof from an ink jet head to form the white ink layer. When the treatment liquid and the white ink composition react with each other, the white ink composition can be preferably rapidly aggregated. In addition, in this step, the treatment liquid is not required to be fully dried. When a step of drying the treatment liquid is omitted, the following ink adhesion step can be started earlier, and a recording rate tends to be further increased. In addition, the recording method of this embodiment may further includes a step of, during or after the white ink adhesion step, drying at least a part of the treatment liquid and the ink composition applied to the recording medium.

The adhesion amount of the white ink composition per unit area in a region (hereinafter, referred to as "adhesion region of the white ink composition" in some cases) on the recording medium to which the white ink composition is adhered is preferably 2 to 25 mg/inch$^2$ and more preferably 10 to 18 mg/inch$^2$. Hereinafter, in each embodiment, this adhesion amount is also simply called "adhesion amount of the white ink composition" in some cases. When the adhesion amount of the white ink composition is in the range described above, the image quality and the abrasion resistance of the recorded matter to be obtained tend to be improved.

The adhesion amount of a white colorant contained in the white ink composition per unit area in the adhesion region of the white ink composition is preferably 0.13 to 3.0 mg/inch$^2$. The adhesion amount described above is preferably 0.20 mg/inch$^2$ or more, more preferably 0.40 mg/inch$^2$ or more, and further preferably 0.80 mg/inch$^2$ or more. The adhesion amount described above is preferably 2.0 mg/inch$^2$ or less, more preferably 1.8 mg/inch$^2$ or less, further preferably 1.6 mg/inch$^2$ or less. When the adhesion amount described above is in the range described above, the image quality of the recorded matter can be further improved.

When the white ink composition is adhered in the white ink adhesion step, a surface temperature of the recording medium is preferably 45° C. or less, more preferably 40° C. or less, and further preferably 35° C. or less. The surface temperature described above is preferably 10° C. or more, more preferably 15° C. or more, and further preferably 20° C. or more. When the surface temperature of the recording medium is in the range described above, the surface is suppressed from being formed to have irregularities, and the image quality and the abrasion resistance of the recorded matter can be further improved. The surface temperature described above may be adjusted, for example, by a platen heater provided in the first drying portion 40 of the platen 35.

—White Ink Composition—

The white ink composition used in the ink jet recording method of this embodiment preferably contains the resin particles and the water-soluble resin. Since the resin particles and the water-soluble resin are contained in the white ink composition, when the white ink composition is adhered to the treatment liquid layer, irregularities generated by aggregation of the white colorant contained in the white ink composition are likely to be smoothed during heating, and the abrasion resistance of the recorded matter can be further improved.

The white ink composition is an ink which contains the white colorant and which forms the white ink layer on the recording medium. Since the white ink layer and the non-white ink layer are formed so as to be overlapped with each other on the recording medium, for example, when recording is performed on a transparent recording medium or a recording medium having a color different from a white color, the visibility of the non-white ink layer can be improved when the recording medium is used to be viewed from a non-white ink layer side. The white ink composition may be a composition having a function of the white ink layer as described above, and the white color is not limited to a pure white color and may also be a slightly chromatic color.

The content of the resin particles and the content of the water-soluble resin in the white ink composition are preferably in the ranges shown in the ink composition described above.

The content of the resin particles in the white ink composition is preferably two times or more the content of the water-soluble resin, more preferably three times or more that of the water-soluble resin, and further preferably four times or more that of the water-soluble resin.

—White Colorant—

The white ink composition (white ink) contains the white colorant. As the white colorant, a white dye or a white pigment may be mentioned, and of the colorants described above, a white pigment is preferable. Although the white colorant is not particularly limited, for example, there may be mentioned an alkaline earth metal sulfate, such as barium sulfate, an alkaline earth metal carbonate, such as calcium carbonate, a silica, such as a fine silicic acid powder or a synthetic silicate, a metal compound, such as calcium silicate, alumina, alumina hydrate, titanium dioxide, or zinc oxide, talc, or clay. Among those mentioned above, titanium dioxide is preferable. As the white colorant, in more particular, C.I. Pigment White 6, 18, or 21 may be mentioned.

The content of the white colorant is preferably 1.0 to 25.0 percent by mass, more preferably 3.0 to 20.0 percent by mass, and further preferably 5.0 to 15.0 percent by mass. Since the white colorant is contained in the range described above, the image quality of the recorded matter can be improved.

—Wax—

In order to improve the abrasion resistance, the white ink composition preferably contains a wax. Although the wax is not particularly limited, for example, a hydrocarbon wax or an ester wax which is a condensate of a fatty acid and a monovalent or a polyvalent alcohol may be mentioned. Although the hydrocarbon wax is not particularly limited, for example, there may be mentioned a paraffin wax or a polyolefin wax, such as a polyethylene wax or a polypropylene wax. Those waxes may be used alone, or at least two types thereof may be used in combination. Among those waxes mentioned above, in order to improve the abrasion resistance, the hydrocarbon wax is preferable, the polyolefin wax is more preferable, and the polyethylene wax is further preferable.

As a commercially available product of the paraffin wax, for example, AQUACER497 or AQUACER539 (product name, manufactured by BYK) may be mentioned.

As a commercially available product of the polyolefin wax, for example, there may be mentioned Chemipearl 5120, 5650, or S75N (product name, manufactured by Mitsui Chemicals Inc.); AQUACER501, AQUACER506, AQUACER513, AQUACER515, AQUACER526, AQUACER593, or AQUACER582 (product name, manufactured by BYK).

The boiling point of the wax is preferably 50° C. to 200° C., more preferably 70° C. to 180° C., and further preferably 90° C. to 180° C.

The wax is preferably added as wax particles contained in an aqueous emulsion in which a wax is dispersed in water. The wax particles may contain, for example, a surfactant for dispersion.

The content of the wax with respect to the total mass of the white ink composition is preferably 0.1 to 5.0 percent by mass, more preferably 0.3 to 4.0 percent by mass, and further preferably 0.5 to 3.0 percent by mass. Since the content of the wax is in the range described above, the abrasion resistance of the recorded matter can be further improved.

—Other Components—

In order to preferably maintain storage stability of the white ink composition and ejection stability thereof from the head, in order to improve the clogging resistance, and/or in order to prevent degradation of the ink composition, to the white ink composition according to this embodiment, various additives, such as a solubilizing agent, a viscosity adjuster, a pH adjuster, an antioxidant, an antiseptic, a fungicide, a corrosion inhibitor, and/or a chelating agent, may be appropriately added.

—Solvent—

The white ink composition of this embodiment preferably further contains a solvent. Although the solvent is not particularly limited, for example, an organic solvent and/or water may be mentioned.

Although the water is not particularly limited, for example, there may be mentioned purified water, such as ion-exchanged water, ultrafiltration water, reverse osmosis water, or distilled water, or water, such as ultrapure water, from which ionic impurities are removed as much as possible. In addition, when water sterilized by ultraviolet radiation or addition of hydrogen peroxide is used, generation of fungi and/or bacteria can be prevented when the ink composition is stored for a long time. As a result, the storage stability tends to be further improved.

The content of the water in the white ink composition is preferably 30.0 to 90.0 percent by mass, more preferably 40.0 to 85.0 percent by mass, and further preferably 50.0 to 80.0 percent by mass. The ink composition is preferably the aqueous composition as described above.

As the organic solvent, a volatile water-soluble organic solvent is more preferable. Although the organic solvent is not particularly limited, for example, there may be mentioned an alcohol or a glycol, such as glycerin, ethylene glycol, diethylene glycol, triethylene glycol, propylene glycol, dipropylene glycol, pentamethylene glycol, trimethylene glycol, 1,3-propanediol, 1,2-butanediol, 1,2-pentanediol, 1,2-hexanediol, 1,4-butanediol, 1,5-pentanediol, 1,6-hexanediol, 2-butene-1,4-diol, 2-ethyl-1,3-hexanediol, 2-methyl-2,4-pentanediol, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-isopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, or tert-pentanol; N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, 1,1,3,3-tetramethyl urea, 1,3-propylene glycol, isopropylene glycol, isobutylene glycol, mesoerythritol, or pentaerythritol. Those organic solvents may be used alone, or at least two types thereof may be used in combination. Among those organic solvents, an alcohol or a glycol is preferable, and propylene glycol or 1,2-hexanediol is more preferable.

The content of the organic solvent in the white ink composition is preferably 1.0 to 50.0 percent by mass, more preferably 3.0 to 30.0 percent by mass, and further preferably 5.0 to 20.0 percent by mass.

—Non-White Ink Adhesion Step—

The non-white ink adhesion step is a step of adhering the non-white ink composition by ejection thereof from an ink jet head to form the non-white ink layer. In this step, the treatment liquid and the white ink composition are not required to be fully dried. While those compositions are not fully dried, since the non-white ink composition is adhered, the increase in recording rate can be achieved. In addition, the recording method of this embodiment may further include a step of, before the non-white ink adhesion step, drying at least a part of the treatment liquid and the white ink composition adhered on the recording medium. In addition, the drying step as described above is preferably a step in which the treatment liquid and the white ink composition are not fully dried but are partially dried. In addition, the recording method of this embodiment may also include a step of, during or after the non-white ink adhesion step, drying at least a part of the non-white ink composition applied to the recording medium.

The adhesion amount of the non-white ink composition in the non-white ink adhesion step is preferably 2 to 20 mg/inch$^2$ and more preferably 2 to 10 mg/inch$^2$. Since the adhesion amount of the non-white ink composition is in the range described above, the image quality and the abrasion resistance of the recorded matter to be obtained can be further improved.

In the white ink adhesion step and the non-white ink adhesion step, by an ink jet method, the white ink composition or the non-white ink composition may be ejected from a line head or a serial head so as to be adhered to the recording medium. In a line method using the line head, the head is fixed, the recording medium is transferred along a sub-scanning direction (longitudinal direction of the recording medium, transport direction), and ink droplets are ejected from nozzle openings of the head in association with this transfer, so that an image can be recorded on the recording medium. In addition, in a serial method using the serial head, the head is transferred along a main scanning direction (lateral direction of the recording medium, width direction), and ink droplets are ejected from nozzle openings of the head in association with this transfer, so that an image can be recorded on the recording medium.

A rate A (unit: g/mol) of the adhesion amount (unit: g) of the white pigment contained in the white ink composition per unit area of an adhesion region on the recording medium to the adhesion amount (unit: mol) of the aggregating agent contained in the treatment liquid per unit area of an adhesion region on the recording medium is preferably 900 to 35,000. When the aggregating agent contained in the treatment liquid contains a polyvalent metal salt, the rate A is preferably 1,700 to 35,000. When the aggregating agent contained in the treatment liquid contains an organic acid polyvalent metal salt, the rate A is preferably 900 to 6,000. Since the rate A is 900 or more, precipitation of the aggregating agent in the treatment liquid, and generation of white cloudiness, stickiness, and odor caused by the treatment liquid can be prevented. In addition, since the rate A is 35,000 or less, an image quality obtained when the ink compositions are overlapped with each other can be further improved. In addition, the rate A can be controlled by the adhesion amounts of the white ink composition and the treatment liquid.

A surface temperature of the recording medium when the non-white ink composition is adhered in the non-white ink adhesion step is preferably 45° C. or less, more preferably 40° C. or less, and further preferably 35° C. or less. The surface temperature described above is preferably 10° C. or more, more preferably 15° C. or more, and further preferably 20° C. or more. Since the surface temperature of the recording medium described above is in the range described above, the smoothing of irregularities of the surface is promoted, and the image quality and the abrasion resistance of the recorded matter can be further improved. The surface temperature described above may be adjusted by the platen heater provided in the first drying portion 40 of the platen 35.

The non-white ink adhesion step may also include the non-white color ink adhesion step of adhering the non-white color ink composition to the recording medium by ejection thereof from an ink jet head to form the non-white color ink layer and the clear ink adhesion step of adhering the clear ink composition to the recording medium by ejection thereof from an ink jet head to form the clear ink layer.

The non-white ink adhesion step preferably includes one of the non-white color ink adhesion step and the clear ink adhesion step and more preferably includes both the non-white color ink adhesion step and the clear ink adhesion step.

The non-white ink composition is an ink composition other than the white ink composition. For example, the non-white color ink composition and the clear ink composition may be mentioned. As the components and compositions of the non-white ink composition, components and compositions similar to those used for the white ink composition may be used other than those described below, such as the white colorant.

—Non-White Color Ink Adhesion Step—

The non-white color ink adhesion step is a step of adhering the non-white color ink composition to the recording medium by ejection thereof from an ink jet head to form the non-white color ink layer. In this step, the treatment liquid and the white ink composition are not required to be fully dried. In the state in which the treatment liquid and the white ink composition are not fully dried, since the non-white color ink composition is adhered, the increase in recording rate can be achieved. In addition, the recording method of this embodiment may also include a step of, during or after the non-white color ink adhesion step, drying at least a part of the non-white color ink composition applied to the recording medium.

The adhesion amount of the non-white color ink composition per unit area of the adhesion region on the recording medium is preferably 1 to 10 mg/inch$^2$, more preferably 2 to 8 mg/inch$^2$, and further preferably 3 to 7 mg/inch$^2$. Since the adhesion amount of the non-white color ink composition is in the range described above, the image quality of the recorded matter to be obtained tends to be further improved.

The adhesion amount of the non-white color ink composition with respect to the total mass of all the ink compositions is preferably 1 to 50 percent by mass, more preferably 10 to 40 percent by mass, and further preferably 15 to 35 percent by mass. Since the adhesion amount of the non-white color ink composition is in the range described above, the image quality of the recorded matter to be obtained tends to be further improved.

—Non-White Color Ink Composition—

The non-white color ink composition used in the ink jet recording method of this embodiment contains a non-white colorant. This non-white color ink composition preferably contains resin particles or a water-soluble resin and more preferably contains resin particles and a water-soluble resin. Since the resin particles or the water-soluble resin is contained in the non-white color ink composition, irregularities generated when the white ink layer is formed can be more likely to be smoothed during heating, and the abrasion resistance of the recorded matter can be improved.

The non-white color ink composition is a composition which can form the non-white color ink layer on the recording medium. By the non-white color ink layer, an image excellent in visibility can be recorded.

The content of the resin particles and the content of the water-soluble resin in the non-white color ink composition are preferably in the ranges shown in the above ink composition.

—Colorant—

The colorant used in the non-white color ink composition will be described below. In addition, as the colorant, a dye and a pigment may be mentioned, and among those mentioned above, a pigment is preferable.

Although carbon black may be mentioned as a black colorant used for a black ink, the black colorant is not particularly limited, and for example, there may be mentioned No. 2300, No. 900, MCF88, No. 33, No. 40, No. 45, No. 52, MA7, MA8, MA100, or No. 2200B (product name, manufactured by Mitsubishi Chemical Corp.); Raven 5750, Raven 5250, Raven 5000, Raven 3500, Raven 1255, or Raven 700 (product name, manufactured by Columbia Carbon); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (product name, manufactured by Cabot Corporation); or Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, or Special Black 4 (product name, manufactured by Degussa).

Although a yellow colorant used for a yellow ink as a color ink is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a magenta colorant used for a magenta ink as a color ink is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

Although a cyan colorant used for a cyan ink as a color ink is not particularly limited, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

Although a color colorant other than the magenta, cyan, and yellow is not particularly limited, for example, there may be mentioned C.I. Pigment Green 7 or 10, C.I. Pigment Brown 3, 5, 25, or 26, C.I. Pigment Orange 1, 2, 5, 7, 13, 14, 15, 16, 24, 34, 36, 38, 40, 43, or 63.

When the pigment is used as the colorant described above, the pigment is preferably added to the non-white color ink composition as a pigment dispersion liquid obtained by dispersing a pigment in water with a dispersant; as a pigment dispersion liquid obtained by dispersing self-dispersive surface-treated pigment particles in water, the pigment particles having surfaces on which hydrophilic groups are introduced using a chemical reaction; or as a pigment dispersion liquid obtained by dispersing a pigment covered with a polymer in water.

Although the dispersant is not particularly limited, for example, there may be mentioned a polymer dispersant or a surfactant. Although the polymer dispersant is not particularly limited, for example, there may be mentioned a protein, such as a glue, a gelatin, a casein, or an albumin; a natural rubber, such as an arabic gum or a tragacanth gum; a glucoside such as a saponin; an alginic acid propylene glycol ester, a triethanolamine alginate, or a fermented product of an ammonium alginate; a cellulose derivative, such as a methylcellulose, a carboxymethyl cellulose, or a hydroxyethyl cellulose; a poly(vinyl alcohol); a poly(vinyl pyrrolidone); an acrylic resin, such as a poly(acrylic acid), an acrylic acid-acrylonitrile copolymer, a potassium acrylate-acrylonitrile copolymer, a vinyl acetate-acrylate copolymer, or an acrylic acid-acrylate copolymer; a styrene-acrylic acid resin, such as a styrene-acrylic acid copolymer, a styrene-methacrylic acid copolymer, a styrene-methacrylic acid-acrylate copolymer, or a styrene-m-methylstyrene-acrylic acid copolymer; a styrene-maleic acid copolymer, a styrene-maleic anhydride copolymer, or a vinyl naphthalene-acrylic acid copolymer; a vinyl acetate copolymer, such as a vinyl acetate-ethylene copolymer, a vinyl acetate-fatty acid vinyl ethylene copolymer, a vinyl acetate-maleate copolymer, a vinyl acetate-croton copolymer, or a vinyl acetate-acrylic acid copolymer; or a salt of each of those mentioned above. Although the surfactant is not particularly limited, for example, there may be mentioned an anionic surfactant, a nonionic surfactant, or an amphoteric surfactant.

The self-dispersive surface-treated pigment on which hydrophilic groups are introduced described above is a pigment configured to be dispersed or dissolved in water without using a dispersant by a surface treatment which directly bonds a carboxy group or its salt to the surface of the pigment. In more particular, by a physical treatment of vacuum plasma or a chemical treatment using an oxidant, such as sodium hypochlorite or ozone, a functional group or a molecule having a functional group is grafted on the surface of the pigment, so that the pigment described above can be obtained. The number of functional groups to be grafted on one pigment particle may be either one or at least two. The type of functional group to be grafted and the degree of grafting may be appropriately determined in consideration of the dispersion stability in the non-white color ink composition, color density, and drying property at a front surface of the ink jet head.

Although the pigment covered with a polymer described above is not particularly limited, for example, the pigment may be obtained such that after a pigment is dispersed using a dispersant having a polymerizable group, emulsion polymerization is performed in water using a monomer (copolymerizable monomer) copolymerizable with the dispersant and a photoradical polymerization initiator. Among the polymers described above, a polymer obtained from a monomer or an oligomer having, as a double bond, at least one of an acryloyl group, a methacryloyl group, a vinyl group, and an allyl group by a known polymerization method using a photoradical polymerization initiator may be preferably used. The emulsion polymerization may be performed using a general method and may be advanced by free radicals generated by thermal decomposition of a water-soluble photoradical polymerization initiator under the presence of an emulsifier.

The pigments and the dispersants forming the above pigment dispersion liquid may be respectively used alone, or at least two types thereof may be used in combination.

The content of the colorant is preferably 1.0 to 20.0 percent by mass, more preferably 2.0 to 15.0 percent by mass, and further preferably 3.0 to 10.0 percent by mass. Since the colorant is contained in the range described above, the image quality of the recorded matter can be improved.

In order to further improve the abrasion resistance of the recorded matter, the non-white color ink composition preferably contains a wax. The type and the content of the wax are preferable as described in the above white ink composition.

The non-white color ink composition may contains various additives, such as a solubilizing agent, a viscosity adjuster, a pH adjuster, an antioxidant, an antiseptic, a fungicide, a corrosion inhibitor, and/or a chelating agent.

As for a solvent in the non-white color ink composition, the type and the amount of the solvent are preferable as described in the above white ink composition.

—Clear Ink Adhesion Step—

The clear ink adhesion step is a step of adhering the clear ink composition to the recording medium by ejection thereof from an ink jet head to form the clear ink layer. In this step, the treatment liquid, the white ink composition, and the non-white color ink composition are not required to be fully dried. In the state in which those compositions are not fully dried, since the clear ink composition is adhered, the increase in recording rate can be achieved. In addition, the recording method of this embodiment may also include a step of, during or after the clear ink adhesion step, drying at least a part of the clear ink composition applied to the recording medium.

The adhesion amount of the clear ink composition per unit area of the adhesion region on the recording medium is preferably 1 to 10 $mg/inch^2$, more preferably 1 to 5 $mg/inch^2$, and further preferably 1 to 3 $mg/inch^2$. Since the adhesion amount of the clear ink composition is in the range described above, the image quality of the recorded matter to be obtained tends to be further improved.

The adhesion amount of the clear ink composition with respect to the total mass of all the ink compositions is preferably 1 to 30 percent by mass, more preferably 2 to 20 percent by mass, and further preferably 3 to 10 percent by mass. Since the adhesion amount of the clear ink composition is in the range described above, the image quality of the recorded matter to be obtained tends to be further improved.

—Clear Ink Composition—

The clear ink composition used in the ink jet recording method of this embodiment preferably contains resin particles or a water-soluble resin and more preferably contains resin particles and a water-soluble resin. The clear ink composition is not an ink which colors the recording medium. In addition, the clear ink composition is not the treatment liquid containing an aggregating agent described above. Since being used to cover the surface of the image, the clear ink composition is frequently used so as to cover the entire surface of the white ink layer. Accordingly, since the resin particles and/or the water-soluble resin is contained in the clear ink composition, irregularities generated by the formation of the white ink layer are likely to be smoothed during heating, and the abrasion resistance of the recorded matter can be further improved.

The content of the resin particles and the content of the water-soluble resin in the clear ink composition are preferably in the ranges shown in the above ink composition.

The clear ink composition may substantially contain no colorant. Based on the assumption that the ink is not an ink to color the recording medium, the content of the colorant in the clear ink composition is preferably less than 1.0 percent by mass, more preferably 0.1 percent by mass or less, and further preferably 0.01 percent by mass or less.

In order to further improve the abrasion resistance of the recorded matter, the clear ink composition preferably contains a wax. The type and the content of the wax are preferable as described in the above white ink composition.

The clear ink composition may also contain various additives, such as a solubilizing agent, a viscosity adjuster, a pH adjuster, an antioxidant, an antiseptic, a fungicide, a corrosion inhibitor, and/or a chelating agent.

As for a solvent in the clear ink composition, the type and the amount of the solvent described in the above white ink composition are preferable.

—Post-Heating Step—

After the treatment liquid adhesion step, the non-white ink adhesion step, and the white ink adhesion step, the ink jet recording method of this embodiment preferably includes a post-heating step of heating the recording medium so that a surface temperature thereof is set to 90° C. or less. Since the post-heating step is provided, the resin particles contained in the ink composition are melted, and the irregularities formed in the surface of the recorded matter can be smoothed, so that the abrasion resistance of the recorded matter can be further improved.

The surface temperature of the recording medium in the post-heating step is preferably more than 45° C., more preferably 50° C. or more, and further preferably 60° C. or more. The surface temperature described above is preferably 85° C. or less. Since the surface temperature described above is controlled as described above, the abrasion resistance of the recorded matter can be further improved.

The post-heating step may be performed in the second drying portion 50 of the ink jet recording apparatus 1. The surface temperature of the recording medium may be adjusted, for example, by the heater provided in the second drying portion 50.

—Recorded Matter—

The recording medium (hereinafter, also referred to as "recorded matter" in some cases) obtained by the ink jet recording method of this embodiment includes the non-white ink layer, the white ink layer, and the treatment liquid layer. In addition, the recorded matter has a region in which the non-white ink layer, the white ink layer, and the treatment liquid layer are overlapped with each other. Since the region in which the layers are overlapped with each other is present, an excellent image quality and an excellent abrasion resistance of the recorded matter can be obtained.

The recorded matter may have the structure in which the recording medium, the treatment liquid layer, the white ink layer, and the non-white ink layer are laminated to each other in this order or the structure in which the recording medium, the treatment liquid layer, the non-white ink layer, and the white ink layer are laminated to each other in this order.

Ink Set

An ink set (hereinafter, simply referred to as "ink set" in some cases) to be used for a recording method performed on a recording medium according to this embodiment contains the white ink composition of this embodiment, the non-white ink composition of this embodiment, and the treatment liquid of this embodiment. The recording method is the ink jet recording method of this embodiment described above. In the ink set of this embodiment, at least one of the white ink composition and the non-white ink composition contains the resin particles and the water-soluble resin, or one of the white ink composition and the non-white ink composition contains the resin particles, and the other contains the water-soluble resin. In addition, in the ink set of this embodiment, the water-soluble resin has a glass transition temperature higher than that of the resin of the resin particles.

According to the structure described above, when the ink jet recording method of this embodiment is used, a recorded matter having an image excellent not only in image quality but also in abrasion resistance can be obtained.

EXAMPLES

Hereinafter, although the present disclosure will be described in detail with reference to examples and comparative examples, the present disclosure is not limited to the following examples.

Glass Transition Temperature

The glass transition temperatures of resin particles and a water-soluble resin were each measured in accordance with JIS K7121: 1987 using a differential scanning calorimeter (DSC) "DSC6220" (product name, manufactured by Seiko Denshi Kogyo Co., Ltd.).

Surface Temperature

A first heating temperature is the maximum surface temperature of a portion of a recording medium at a recording surface side at which the ink adhesion step is performed. In particular, the first heating temperature is a temperature at a portion of the recording medium which faces an ink jet head during recording. In addition, in the recording method of this embodiment, although the recording medium is not required to be heated in the ink adhesion step, in this case, the temperature thereof is described as the first heating temperature.

A second heating temperature is the maximum surface temperature of the recording medium at a recording surface side which is heated in the post-heating step during the recording.

The temperatures described above were each measure by a contactless type thermometer.

—Preparation of Ink Composition and Treatment Liquid—

Materials were mixed together to have compositions shown in the following Table 1 and were sufficiently stirred, so that ink compositions and treatment liquids were obtained. In particular, after the materials were uniformly mixed together, insoluble materials were removed with a filter, so that the ink compositions and the treatment liquids were prepared. In addition, in the following Table 1, the unit of the numerical value indicates percent by mass, and the total indicates 100.0 percent by mass. In addition, the ink compositions contained resin particles and water-soluble resins, and the types and the amounts thereof are shown in Table 2. In addition, as a colorant, a pigment dispersion liquid was prepared in advance such that a pigment was dispersed in water using a pigment dispersant not shown in the table, and this liquid was used for preparation of the ink composition.

TABLE 1

Table 1

| | | WHITE INK COMPOSITION | NON-WHITE COLOR INK COMPOSITION | CLEAR INK COMPOSITION | TREATMENT LIQUID 1 | TREATMENT LIQUID 2 | TREATMENT LIQUID 3 |
|---|---|---|---|---|---|---|---|
| COMPOSITION (PERCENT BY MASS) | WHITE COLORANT, TITANIUM DIOXIDE | 10.0 | | | | | |
| | NON-WHITE COLORANT P.B.15:3 | | 5.0 | | | | |
| | RESIN PARTICLES | SHOWN IN TABLE 2 | SHOWN IN TABLE 2 | SHOWN IN TABLE 2 | | | |

TABLE 1-continued

Table 1

|  | WHITE INK COMPOSITION | NON-WHITE COLOR INK COMPOSITION | CLEAR INK COMPOSITION | TREATMENT LIQUID 1 | TREATMENT LIQUID 2 | TREATMENT LIQUID 3 |
|---|---|---|---|---|---|---|
| WATER-SOLUBLE RESIN | SHOWN IN TABLE 2 | SHOWN IN TABLE 2 | SHOWN IN TABLE 2 |  |  |  |
| POLYETHYLENE WAX | 1.0 | 0.5 | 2.0 |  |  |  |
| PROPYLENE GLYCOL | 12.0 | 10.0 | 10.0 |  |  |  |
| 1,2-BUTANEDIOL |  |  |  | 5.0 | 5.0 | 5.0 |
| 1,2-HEXANEDIOL | 3.0 | 5.0 | 5.0 | 3.0 | 3.0 | 3.0 |
| NONIONIC SURFACTANT | 1.0 | 1.0 | 1.0 | 1.0 | 1.0 | 1.0 |
| CALCIUM PROPIONATE |  |  |  | 15.0 |  |  |
| CALCIUM NITRATE |  |  |  |  | 15.0 |  |
| CATIONIC POLYMER |  |  |  |  |  | 10.0 |
| WATER | BALANCE | BALANCE | BALANCE | BALANCE | BALANCE | BALANCE |
| TOTAL | 100.0 | 100.0 | 100.0 | 100.0 | 100.0 | 100.0 |

White colorant: titanium dioxide
Non-white colorant: C.I. Pigment Blue 15: 3
Nonionic surfactant: BYK-348 (silicone surfactant, manufactured by BYK-Chemie)
Cationic surfactant: Catiomaster PDT-2 (product name, manufactured by Yokkaichi Chemical Co., Ltd.)

Ink Jet Recording Method (Examples 1 to 19, Comparative Examples 1 to 8)

As an ink jet printer, a modified printer was used which was formed by modifying a serial printer "SC-580650" manufactured by Seiko Epson Corporation into a serial printer as shown in FIGURE. Printing was performed under the following printing conditions. During ink jet recording, a platen heater was operated, and a recording side surface temperature (maximum temperature during recording) of the recording medium at a position facing a head is shown as the first heating temperature in the tables. A second drying portion was provided downstream than the head. A surface temperature of the recording surface of the recording medium at the second drying portion is shown as a second heating temperature in the tables.

In the ink jet printer, from upstream in a recording medium transport direction, a treatment liquid head, a color ink head 1, a color ink head 2, and a clear ink head were disposed in this order, and in accordance with this order, the ink compositions were configured to be adhered to the recording medium.

The example in which "white first" is shown in the table was performed so that a white ink composition and a non-white color ink composition were set so as to be ejected from the color ink head 1 and the color ink head 2, respectively. The ink compositions described above were each adhered to the recording medium. Accordingly, a non-white ink layer was formed on the recording medium so as to be overlapped on a white ink layer.

The example in which "white after" is shown in the table was performed so that the non-white color ink composition and the white ink composition were set so as to be ejected from the color ink head 1 and the color ink head 2, respectively. The ink compositions described above were each adhered to the recording medium. Accordingly, the white ink layer was formed on the recording medium so as to be overlapped on the non-white ink layer.

In the examples and the comparative examples in each of which the type of the treatment liquid is shown in the column of "treatment liquid" in the table, the treatment liquid was ejected from the treatment liquid head and was adhered to the recording medium. Accordingly, the ink layers were formed on the recording medium so as to be overlapped on a treatment liquid layer.

In the examples and the comparative examples in each of which the column of "clear" is provide in the table, a clear ink was ejected from the clear ink head and was adhered to the recording medium. Accordingly, a clear ink layer was formed on the recording medium so as to be overlapped on the ink layers.

As described above, evaluation images were recorded. Hereinafter, the image is also called "solid pattern" in some cases.

Printing Conditions
  Adhesion amount of each layer:
  White ink composition: 15 mg/inch$^2$
  Non-white color ink composition: 7 mg/inch$^2$
  Clear ink composition: 2 mg/inch$^2$
  Treatment liquid: the treatment liquid adhesion amount to the total adhesion amount of the ink compositions is shown in the table.
  Number of printing passes of each ink composition and treatment liquid: four passes
  Nozzle density of nozzle lines of head: 600 dpi, 600 nozzles
  Recording medium: biaxially oriented polypropylene film "Pyrene (registered trademark) Film-OT, model No. P2111" (product name, manufactured by Toyobo Co., Ltd., thickness: 20 μm)

—Evaluation—
—Abrasion Resistance—

A solid pattern portion was rubbed 100 times with a plain woven-cloth using a Gakushin-type abrasion resistance tester (load: 500 g), and the degree of peeling was evaluated by visual inspection in accordance with the following evaluation criteria.

Evaluation Criteria
  A: solid pattern portion is not peeled.
  B: 10% or less of the total area of solid pattern portion is peeled.
  C: more that 10% to 30% of the total area of solid pattern portion is peeled.
  D: more than 30% of the total area of solid pattern portion is peeled.

—Image Quality—

As an image, a square solid pattern of 5×5 cm was formed. This solid pattern was observed from a non-white color ink layer side and was evaluated in accordance with the following evaluation criteria.

Evaluation Criteria

A: No density irregularity is observed in solid pattern.

B: Slight density irregularity is observed in solid pattern.

C: Density irregularity is appreciably observed in solid pattern.

—Cracking Resistance—

As an image, a rectangular solid pattern portion was formed. The solid pattern portion was observed from two sides of the recording medium and was evaluated in accordance with the following criteria, and a worse evaluation result was regarded as the evaluation of each of the examples and comparative examples.

Evaluation Criteria

A: In sold pattern portion, no cracks are observed by visual inspection and with a loupe.

B: In sold pattern portion, no cracks are observed by visual inspection, but cracks are slightly observed with a loupe.

C: Cracks are observed by visual inspection.

—Clogging Resistance—

Under the printing conditions of the ink jet recording method described above, recording was continuously performed for 120 minutes. After the recording, the white ink nozzles and the non-white ink nozzles were each checked whether the ejection was performed or not.

Evaluation Criteria

A: Ejection is performed from each nozzle.

B: Ejection is not performed by one percent or less of all nozzles.

C: Ejection is not performed by more than one percent of all nozzles.

Adhesion

A cross-cut test was performed on a solid pattern portion of a recorded matter obtained under the printing conditions of the ink jet recording method described above.

By the use of a cutting tool (commercially available general cutter), a blade thereof was applied to the pattern in a direction perpendicular thereto to form squares each having a size of 1 mm×1 mm, so that a grid having 10×10 squares was formed.

A transparent adhesive tape (width: 25 mm) having a length of approximately 75 mm was adhered to the grid and was sufficiently rubbed with fingers so that the pattern was observed through the tape. Next, within 5 minutes after the tape was adhered, the tape was surely peeled away from the pattern at an angle of approximately 60° within 0.5 to 1.0 second, the state of the grid was then observed by visual inspection or with a loupe, and the result was evaluated in accordance with the following evaluation criteria. In addition, in each grid, if at least one of the ink layers thus formed was peeled away, the state described above was regarded that the peeling occurred.

Evaluation Criteria

A: No peeling of the pattern is observed in the grid.

B: Peeling of less than 5% of the pattern is observed in the grid.

C: Peeling of 5% to less than 35% of the pattern is observed in the grid.

D: Peeling of 35% or more of the pattern is observed in the grid.

TABLE 2

Table 2(1/4)

| | | EXAMPLE 1 | | EXAMPLE 2 | | EXAMPLE 3 | | EXAMPLE 4 | |
| --- | --- | --- | --- | --- | --- | --- | --- | --- | --- |
| | | INK COMPOSITION | | | | | | | |
| | | WHITE INK | NON-WHITE COLOR INK | WHITE INK | NON-WHITE COLOR INK | WHITE INK | NON-WHITE COLOR INK | WHITE INK | NON-WHITE COLOR INK |
| RESIN PARTICLES 1 | ACRYLIC RESIN Tg = 41° C. | | | 3.0 | 2.0 | | | | |
| RESIN PARTICLES 2 | ACRYLIC RESIN Tg = 80° C. | 3.0 | 2.0 | | | | 2.0 | 1.0 | 2.0 |
| RESIN PARTICLES 3 | ACRYLIC RESIN Tg = 108° C. | | | | | | | | |
| RESIN PARTICLES 4 | ACRYLIC RESIN Tg = −27° C. | | | | | | 3.0 | | |
| RESIN PARTICLES 5 | URETHANE RESIN Tg = 75° C. | | | | | | | | |
| WATER-SOLUBLE RESIN 1 | URETHANE RESIN Tg = 118° C. | 1.0 | | 1.0 | | 1.0 | | 3.0 | |
| WATER-SOLUBLE RESIN 2 | URETHANE RESIN Tg = 97° C. | | | | | | | | |
| WATER-SOLUBLE RESIN 3 | ACRYLIC RESIN Tg = 105° C. | | | | | | | | |
| Tg OF WATER-SOLUBLE RESIN − Tg OF RESIN PARTICLES (° C.) | | 38 | | 77 | | 145.38 | | 38 | |
| TREATMENT LIQUID | | TREATMENT LIQUID 1 | | TREATMENT LIQUID 1 | | TREATMENT LIQUID 1 | | TREATMENT LIQUID 1 | |
| ADHESION AMOUNT OF TREATMENT LIQUID (PERCENT BY MASS TO OTHER INKS) | | 25 | | 25 | | 25 | | 25 | |
| FIRST HEATING TEMPERATURE (° C.) | | 30 | | 30 | | 30 | | 30 | |
| SECOND HEATING TEMPERATURE (° C.) | | 80 | | 80 | | 80 | | 80 | |
| ABRASION RESISTANCE | WHITE FIRST | A | | B | | B | | B | |
| | WHITE AFTER | B | | C | | C | | C | |
| MAGE QUALITY | WHITE FIRST | A | | A | | A | | A | |
| | WHITE AFTER | A | | A | | A | | A | |
| ADHESION | WHITE FIRST | B | | A | | B | | C | |
| | WHITE AFTER | A | | A | | B | | C | |
| CRACKING RESISTANCE | WHITE FIRST | A | | A | | C | | C | |
| | WHITE AFTER | A | | A | | B | | A | |
| CLOGGING RESISTANCE | | B | A | C | B | C | A | B | A |

TABLE 2-continued

Table 2(1/4)

|  |  | EXAMPLE 5 | | EXAMPLE 6 | | EXAMPLE 7 | | EXAMPLE 8 | |
|---|---|---|---|---|---|---|---|---|---|
|  |  | INK COMPOSITION | | | | | | | |
|  |  | WHITE INK | NON-WHITE COLOR INK | WHITE INK | NON-WHITE COLOR INK | WHITE INK | NON-WHITE COLOR INK | WHITE INK | NON-WHITE COLOR INK |
| RESIN PARTICLES 1 | ACRYLIC RESIN Tg = 41° C. | | | | | | | | |
| RESIN PARTICLES 2 | ACRYLIC RESIN Tg = 80° C. | 4.0 | 1.0 | 8.0 | 3.0 | | | 3.0 | 2.0 |
| RESIN PARTICLES 3 | ACRYLIC RESIN Tg = 108° C. | | | | | | | | |
| RESIN PARTICLES 4 | ACRYLIC RESIN Tg = −27° C. | | | | | | | | |
| RESIN PARTICLES 5 | URETHANE RESIN Tg = 75° C. | | | | | 3.0 | 2.0 | | |
| WATER-SOLUBLE RESIN 1 | URETHANE RESIN Tg = 118° C. | 0.5 | | 4.0 | | 1.0 | | | |
| WATER-SOLUBLE RESIN 2 | URETHANE RESIN Tg = 97° C. | | | | | | | | |
| WATER-SOLUBLE RESIN 3 | ACRYLIC RESIN Tg = 105° C. | | | | | | | | |
| Tg OF WATER-SOLUBLE RESIN − Tg OF RESIN PARTICLES (° C.) | | 38 | | 38 | | 43 | | 17 | |
| TREATMENT LIQUID | | TREATMENT LIQUID 1 | | TREATMENT LIQUID 1 | | TREATMENT LIQUID 1 | | TREATMENT LIQUID 1 | |
| ADHESION AMOUNT OF TREATMENT LIQUID (PERCENT BY MASS TO OTHER INKS) | | 25 | | 25 | | 25 | | 25 | |
| FIRST HEATING TEMPERATURE (° C.) | | 30 | | 30 | | 30 | | 30 | |
| SECOND HEATING TEMPERATURE (° C.) | | 80 | | 80 | | 80 | | 80 | |
| ABRASION RESISTANCE | WHITE FIRST | B | | A | | B | | B | |
|  | WHITE AFTER | C | | A | | B | | C | |
| MAGE QUALITY | WHITE FIRST | B | | B | | A | | A | |
|  | WHITE AFTER | B | | B | | A | | A | |
| ADHESION | WHITE FIRST | B | | A | | A | | B | |
|  | WHITE AFTER | B | | A | | A | | B | |
| CRACKING RESISTANCE | WHITE FIRST | A | | A | | B | | B | |
|  | WHITE AFTER | A | | A | | B | | B | |
| CLOGGING RESISTANCE | | C | A | C | B | B | A | B | A |

Table 2(2/4)

|  |  | EXAMPLE 9 | | EXAMPLE 10 | | EXAMPLE 11 | | EXAMPLE 12 |
|---|---|---|---|---|---|---|---|---|
|  |  | INK COMPOSITION | | | | | | |
|  |  | WHITE INK | NON-WHITE COLOR INK | WHITE INK | NON-WHITE COLOR INK | WHITE INK | NON-WHITE COLOR INK | WHITE INK |
| RESIN PARTICLES 1 | ACRYLIC RESIN Tg = 41° C. | | | | | | | |
| RESIN PARTICLES 2 | ACRYLIC RESIN Tg = 80° C. | 3.0 | 2.0 | 3.0 | 2.0 | 3.0 | 2.0 | 1.0 |
| RESIN PARTICLES 3 | ACRYLIC RESIN Tg = 108° C. | | | | | | | |
| RESIN PARTICLES 4 | ACRYLIC RESIN Tg = −27° C. | | | | | | | |
| RESIN PARTICLES 5 | URETHANE RESIN Tg = 75° C. | | | | | | | |
| WATER-SOLUBLE RESIN 1 | URETHANE RESIN Tg = 118° C. | | | 1.0 | | 1.0 | | 3.0 |
| WATER-SOLUBLE RESIN 2 | URETHANE RESIN Tg = 97° C. | | | | | | | |
| WATER-SOLUBLE RESIN 3 | ACRYLIC RESIN Tg = 105° C. | 1.0 | | | | | | |
| Tg OF WATER-SOLUBLE RESIN − Tg OF RESIN PARTICLES (° C.) | | 25 | | 38 | | 38 | | 38 |
| TREATMENT LIQUID | | TREATMENT LIQUID 1 | | TREATMENT LIQUID 1 | | TREATMENT LIQUID 2 | | TREATMENT LIQUID 3 |
| ADHESION AMOUNT OF TREATMENT LIQUID (PERCENT BY MASS TO OTHER INKS) | | 25 | | 25 | | 25 | | 25 |
| FIRST HEATING TEMPERATURE (° C.) | | 30 | | 30 | | 30 | | 30 |
| SECOND HEATING TEMPERATURE (° C.) | | 80 | | 80 | | 80 | | 80 |
| ABRASION RESISTANCE | WHITE FIRST | A | | B | | A | | A |
|  | WHITE AFTER | A | | C | | B | | B |
| IMAGE QUALITY | WHITE FIRST | A | | A | | A | | A |
|  | WHITE AFTER | A | | A | | A | | A |
| ADHESION | WHITE FIRST | B | | C | | B | | A |
|  | WHITE AFTER | B | | B | | A | | B |
| CRACKING RESISTANCE | WHITE FIRST | B | | B | | A | | B |
|  | WHITE AFTER | A | | B | | A | | A |
| CLOGGING RESISTANCE | | B | A | A | B | B | A | B |

TABLE 2-continued

Table 2(2/4)

|  |  | EXAMPLE 12 | | | EXAMPLE 13 | | | EXAMPLE 14 | |
| --- | --- | --- | --- | --- | --- | --- | --- | --- | --- |
|  |  | INK COMPOSITION | | | | | | | |
|  |  | NON-WHITE COLOR INK | WHITE INK | CLEAR INK | NON-WHITE COLOR INK | WHITE INK | CLEAR INK | NON-WHITE COLOR INK | WHITE INK |
| RESIN PARTICLES 1 | ACRYLIC RESIN Tg = 41° C. | | | | | | | | |
| RESIN PARTICLES 2 | ACRYLIC RESIN Tg = 80° C. | 2.0 | 3.0 | 2.0 | 5.0 | 3.0 | 2.0 | 3.0 | |
| RESIN PARTICLES 3 | ACRYLIC RESIN Tg = 108° C. | | | | | | | | |
| RESIN PARTICLES 4 | ACRYLIC RESIN Tg = −27° C. | | | | | | | | |
| RESIN PARTICLES 5 | URETHANE RESIN Tg = 75° C. | | | | | | | | |
| WATER-SOLUBLE RESIN 1 | URETHANE RESIN Tg = 118° C. | | 1.0 | | 1.0 | 1.0 | | 3.0 | |
| WATER-SOLUBLE RESIN 2 | URETHANE RESIN Tg = 97° C. | | | | | | | | |
| WATER-SOLUBLE RESIN 3 | ACRYLIC RESIN Tg = 105° C. | | | | | | | | |
| Tg OF WATER-SOLUBLE RESIN − Tg OF RESIN PARTICLES (° C.) | | 38 | | | 38 | | | 38 | |
| TREATMENT LIQUID | | TREATMENT LIQUID 3 | | | TREATMENT LIQUID 1 | | | TREATMENT LIQUID 1 | |
| ADHESION AMOUNT OF TREATMENT LIQUID (PERCENT BY MASS TO OTHER INKS) | | 25 | | | 25 | | | 25 | |
| FIRST HEATING TEMPERATURE (° C.) | | 30 | | | 30 | | | 30 | |
| SECOND HEATING TEMPERATURE (° C.) | | 80 | | | 80 | | | 80 | |
| ABRASION RESISTANCE | WHITE FIRST | A | | | A | | | A | |
|  | WHITE AFTER | B | | | B | | | A | |
| IMAGE QUALITY | WHITE FIRST | A | | | A | | | A | |
|  | WHITE AFTER | A | | | A | | | A | |
| ADHESION | WHITE FIRST | B | | | A | | | B | |
|  | WHITE AFTER | B | | | A | | | A | |
| CRACKING RESISTANCE | WHITE FIRST | B | | | A | | | B | |
|  | WHITE AFTER | A | | | A | | | B | |
| CLOGGING RESISTANCE | | A | B | A | B | B | A | C | |

Table 2(3/4)

|  |  | EXAMPLE 15 | | | EXAMPLE 16 | | EXAMPLE 17 |
| --- | --- | --- | --- | --- | --- | --- | --- |
|  |  | INK COMPOSITION | | | | | |
|  |  | WHITE INK | NON-WHITE COLOR INK | CLEAR INK | WHITE INK | NON-WHITE COLOR INK | WHITE INK |
| RESIN PARTICLES 1 | ACRYLIC RESIN Tg = 41° C. | | | | | | 3.0 |
| RESIN PARTICLES 2 | ACRYLIC RESIN Tg = 80° C. | 3.0 | 2.0 | 3.0 | 3.0 | 2.0 | |
| RESIN PARTICLES 3 | ACRYLIC RESIN Tg = 108° C. | | | | | | |
| RESIN PARTICLES 4 | ACRYLIC RESIN Tg = −27° C. | | | | | | |
| RESIN PARTICLES 5 | URETHANE RESIN Tg = 75° C. | | | | | | |
| WATER-SOLUBLE RESIN 1 | URETHANE RESIN Tg = 118° C. | | | 3.0 | 1.0 | | 1.0 |
| WATER-SOLUBLE RESIN 2 | URETHANE RESIN Tg = 97° C. | | | | | | |
| WATER-SOLUBLE RESIN 3 | ACRYLIC RESIN Tg = 105° C. | | | | | | |
| Tg OF WATER-SOLUBLE RESIN − Tg OF RESIN PARTICLES (° C.) | | 38 | | | 38 | | 77 |
| TREATMENT LIQUID | | TREATMENT LIQUID 1 | | | TREATMENT LIQUID 1 | | TREATMENT LIQUID 1 |
| ADHESION AMOUNT OF TREATMENT LIQUID (PERCENT BY MASS TO OTHER INKS) | | 25 | | | 25 | | 25 |
| FIRST HEATING TEMPERATURE (° C.) | | 30 | | | 35 | | 30 |
| SECOND HEATING TEMPERATURE (° C.) | | 80 | | | 80 | | 75 |
| ABRASION RESISTANCE | WHITE FIRST | B | | | A | | B |
|  | WHITE AFTER | C | | | B | | C |
| IMAGE QUALITY | WHITE FIRST | A | | | A | | A |
|  | WHITE AFTER | A | | | A | | A |
| ADHESION | WHITE FIRST | C | | | B | | A |
|  | WHITE AFTER | B | | | A | | A |
| CRACKING RESISTANCE | WHITE FIRST | C | | | A | | A |
|  | WHITE AFTER | B | | | A | | A |
| CLOGGING RESISTANCE | | A | A | C | C | B | C |

TABLE 2-continued

Table 2(3/4)

| | | EXAMPLE 17 | EXAMPLE 18 | | EXAMPLE 19 | |
|---|---|---|---|---|---|---|
| | | INK COMPOSITION | | | | |
| | | NON-WHITE COLOR INK | WHITE INK | NON-WHITE COLOR INK | WHITE INK | NON-WHITE COLOR INK |
| RESIN PARTICLES 1 | ACRYLIC RESIN Tg = 41° C. | 2.0 | | | | |
| RESIN PARTICLES 2 | ACRYLIC RESIN Tg = 80° C. | | | | | 2.0 |
| RESIN PARTICLES 3 | ACRYLIC RESIN Tg = 108° C. | | | | | |
| RESIN PARTICLES 4 | ACRYLIC RESIN Tg = −27° C. | | | | 3.0 | |
| RESIN PARTICLES 5 | URETHANE RESIN Tg = 75° C. | | 3.0 | 2.0 | | |
| WATER-SOLUBLE RESIN 1 | URETHANE RESIN Tg = 118° C. | | 1.0 | | 1.0 | |
| WATER-SOLUBLE RESIN 2 | URETHANE RESIN Tg = 97° C. | | | | | |
| WATER-SOLUBLE RESIN 3 | ACRYLIC RESIN Tg = 105° C. | | | | | |
| Tg OF WATER-SOLUBLE RESIN − Tg OF RESIN PARTICLES (° C.) | | 77 | 43 | | 145.38 | |
| TREATMENT LIQUID | | TREATMENT LIQUID 1 | TREATMENT LIQUID 1 | | TREATMENT LIQUID 1 | |
| ADHESION AMOUNT OF TREATMENT LIQUID (PERCENT BY MASS TO OTHER INKS) | | 25 | 25 | | 10 | |
| FIRST HEATING TEMPERATURE (° C.) | | 30 | 30 | | 30 | |
| SECOND HEATING TEMPERATURE (° C.) | | 75 | 75 | | 80 | |
| ABRASION RESISTANCE | WHITE FIRST | B | C | | A | |
| | WHITE AFTER | C | C | | B | |
| IMAGE QUALITY | WHITE FIRST | A | A | | B | |
| | WHITE AFTER | A | A | | B | |
| ADHESION | WHITE FIRST | A | B | | A | |
| | WHITE AFTER | A | B | | A | |
| CRACKING RESISTANCE | WHITE FIRST | A | A | | B | |
| | WHITE AFTER | A | A | | B | |
| CLOGGING RESISTANCE | | C | B | A | C | A |

Table 2(4/4)

| | | COMPARATIVE EXAMPLE 1 | | COMPARATIVE EXAMPLE 2 | | COMPARATIVE EXAMPLE 3 | | COMPARATIVE EXAMPLE 4 | |
|---|---|---|---|---|---|---|---|---|---|
| | | INK COMPOSITION | | | | | | | |
| | | WHITE INK | NON-WHITE COLOR INK | WHITE INK | NON-WHITE COLOR INK | WHITE INK | NON-WHITE COLOR INK | WHITE INK | NON-WHITE COLOR INK |
| RESIN PARTICLES 1 | ACRYLIC RESIN Tg = 41° C. | | | | | | | | |
| RESIN PARTICLES 2 | ACRYLIC RESIN Tg = 80° C. | 3.0 | 2.0 | 4.0 | 1.0 | 3.0 | 2.0 | | |
| RESIN PARTICLES 3 | ACRYLIC RESIN Tg = 108° C. | | | | | 1.0 | | | |
| RESIN PARTICLES 4 | ACRYLIC RESIN Tg = −27° C. | | | | | | | | |
| RESIN PARTICLES 5 | URETHANE RESIN Tg = 75° C. | | | | | | | | |
| WATER-SOLUBLE RESIN 1 | URETHANE RESIN Tg = 118° C. | | | | | | | 4.0 | 2.0 |
| WATER-SOLUBLE RESIN 2 | URETHANE RESIN Tg = 97° C. | | | | | | | | |
| WATER-SOLUBLE RESIN 3 | ACRYLIC RESIN Tg = 105° C. | | | | | | | | |
| Tg OF WATER-SOLUBLE RESIN − Tg OF RESIN PARTICLES (° C.) | | — | | — | | — | | — | |
| TREATMENT LIQUID | | TREATMENT LIQUID 1 | | TREATMENT LIQUID 1 | | TREATMENT LIQUID 1 | | TREATMENT LIQUID 1 | |
| ADHESION AMOUNT OF TREATMENT LIQUID (PERCENT BY MASS TO OTHER INKS) | | 25 | | 25 | | 25 | | 25 | |
| FIRST HEATING TEMPERATURE (° C.) | | 30 | | 30 | | 30 | | 30 | |
| SECOND HEATING TEMPERATURE (° C.) | | 80 | | 80 | | 80 | | 80 | |
| ABRASION RESISTANCE | WHITE FIRST | C | | C | | C | | D | |
| | WHITE AFTER | D | | D | | D | | D | |
| IMAGE QUALITY | WHITE FIRST | A | | A | | A | | A | |
| | WHITE AFTER | A | | A | | A | | A | |
| ADHESION | WHITE FIRST | D | | D | | D | | D | |
| | WHITE AFTER | C | | B | | B | | D | |
| CRACKING RESISTANCE | WHITE FIRST | C | | C | | C | | B | |
| | WHITE AFTER | C | | C | | C | | B | |
| CLOGGING RESISTANCE | | A | A | C | A | C | A | C | B |

TABLE 2-continued

Table 2(4/4)

| | | COMPARATIVE EXAMPLE 5 | | COMPARATIVE EXAMPLE 6 | | COMPARATIVE EXAMPLE 7 | | COMPARATIVE EXAMPLE 8 | |
|---|---|---|---|---|---|---|---|---|---|
| | | INK COMPOSITION | | | | | | | |
| | | WHITE INK | NON-WHITE COLOR INK | WHITE INK | NON-WHITE COLOR INK | WHITE INK | NON-WHITE COLOR INK | WHITE INK | NON-WHITE COLOR INK |
| RESIN PARTICLES 1 | ACRYLIC RESIN Tg = 41° C. | | | | | | | | |
| RESIN PARTICLES 2 | ACRYLIC RESIN Tg = 80° C. | | | | | 3.0 | 2.0 | 3.0 | 2.0 |
| RESIN PARTICLES 3 | ACRYLIC RESIN Tg = 108° C. | 3.0 | 2.0 | 3.0 | 2.0 | | | | |
| RESIN PARTICLES 4 | ACRYLIC RESIN Tg = −27° C. | | | | | | | | |
| RESIN PARTICLES 5 | URETHANE RESIN Tg = 75° C. | | | | | | | | |
| WATER-SOLUBLE RESIN 1 | URETHANE RESIN Tg = 118° C. | | | | | | | 1.0 | |
| WATER-SOLUBLE RESIN 2 | URETHANE RESIN Tg = 97° C. | | | 1.0 | | | | | |
| WATER-SOLUBLE RESIN 3 | ACRYLIC RESIN Tg = 105° C. | 1.0 | | | | | | | |
| Tg OF WATER-SOLUBLE RESIN − Tg OF RESIN PARTICLES (° C.) | | −3 | | −11 | | — | | 38 | |
| TREATMENT LIQUID | | TREATMENT LIQUID 1 | | TREATMENT LIQUID 1 | | — | | — | |
| ADHESION AMOUNT OF TREATMENT LIQUID (PERCENT BY MASS TO OTHER INKS) | | 25 | | 25 | | — | | — | |
| FIRST HEATING TEMPERATURE (° C.) | | 30 | | 30 | | 30 | | 30 | |
| SECOND HEATING TEMPERATURE (° C.) | | 80 | | 80 | | 80 | | 80 | |
| ABRASION RESISTANCE | WHITE FIRST | C | | D | | A | | A | |
| | WHITE AFTER | D | | D | | A | | A | |
| IMAGE QUALITY | WHITE FIRST | A | | A | | C | | C | |
| | WHITE AFTER | A | | A | | C | | C | |
| ADHESION | WHITE FIRST | D | | C | | A | | A | |
| | WHITE AFTER | C | | C | | A | | A | |
| CRACKING RESISTANCE | WHITE FIRST | B | | B | | B | | A | |
| | WHITE AFTER | B | | B | | A | | A | |
| CLOGGING RESISTANCE | | A | A | A | A | A | A | B | A |

In addition, in the tables, the amount of the resin particles indicates a solid content.

Resin particles 1: acrylic resin particles "Boncoat CP-6450" (product name, manufactured by DIC Corporation, Tg: 41° C.)

Resin particles 2: acrylic resin particles "AST499" (product name, manufactured by Daicel FineChem Ltd., Tg: 80° C.)

Resin particles 3: acrylic resin particles "XK-52" (product name, manufactured by Kusumoto Chemicals, Ltd., Tg: 108° C.)

Resin particles 4: acrylic resin particles "vinyblan 2600" (product name, manufactured by Shin-Etsu Chemical Co., Ltd., Tg: −27° C.)

Resin particles 5: urethane resin particles "Superflex170" (product name, manufactured by DKS Co., Ltd., Tg: 75° C.)

Water-soluble resin 1: water-soluble urethane resin (Tg: 118° C.)

Water-soluble resin 2: water-soluble urethane resin (Tg: 97° C.)

Water-soluble resin 3: water-soluble urethane resin (Tg: 105° C.)

As the above water-soluble urethane resin, a water-soluble urethane resin was prepared using a large amount of hydrophilic components during urethane polymerization. In addition, the components to be used were selected, so that the glass transition temperature thereof was set to a predetermined value.

As the above water-soluble acrylic resin, an acrylic acid and an acrylate monomer were copolymerized using a large amount of hydrophilic components to form a water-soluble acrylic resin. In addition, the components to be used were selected, so that the glass transition temperature thereof was set to a predetermined value.

From the results of the examples and the comparative examples, it is found that according to the ink jet recording method of this embodiment, a recorded matter having an image excellent not only in image quality but also in abrasion resistance can be obtained.

When Example 1 is compared to Comparative Examples 1 to 4, it is found that since the ink composition contains the resin particles and the water-soluble resin, an ink jet recording method can be performed so that a recorded matter having an image excellent not only in image quality but also in abrasion resistance is obtained.

When Example 1 is compared to Comparative Example 5 or 6, it is found that since the glass transition temperature of the water-soluble resin is higher than that of the resin of the resin particles, an ink jet recording method can be performed so that a recorded matter having an image excellent not only in image quality but also in abrasion resistance is obtained.

When Example 1 is compared to Comparative Example 7 or 8, it is found that since the treatment liquid is used, the image quality of the recorded matter obtained by the ink jet recording method can be improved. In addition, by comparison between Comparative Examples 7 and 8 and between Comparative Example 7 and the other comparative examples, it is also found that when the treatment liquid is not used, the problem of the abrasion resistance is not generated, and hence, it is understood that the problem to be solved by this embodiment is a specific problem that occurs when the treatment liquid is used.

When Example 1 is compared to Example 2, it is found that since the glass transition temperature of the resin of the resin particles is increased, the abrasion resistance of the recorded matter can be further improved.

When Example 1 is compared to Example 3, it is found that since the glass transition temperature of the resin of the resin particles is increased, the cracking resistance of the recorded matter can be improved.

From Examples 1, 4, and 5, it is found that in a wide range of the mass ratio between the resin particles and the water-soluble resin particles, the effect of the ink jet recording method of this embodiment can be obtained. In addition, from the comparison in result between Examples 1 and 4, it is found that when the rate of the resin particles is increased, an excellent image adhesion can be obtained.

From the comparison between Examples 1 and 6, it is found that since the contents of the resin particles and the water-soluble resins are decreased, the clogging resistance can be improved.

From the results of Examples 1, 2, and 7 to 9, it is found that by various types of resin particles and water-soluble resins, effects similar to each other can be obtained.

From the comparison between Examples 1 and 10, it is found that although the water-soluble resin may be contained in any of the white ink composition and the non-white ink composition, when the water-soluble resin is contained in the white ink composition, the abrasion resistance can be further improved.

From the results of Examples 1, 11, and 12, it is found that even when various aggregating agents are used, the effect of this embodiment can be obtained.

From the results of Examples 13 to 15, it is found that as the non-white ink composition, even when the non-white color ink composition and the clear ink composition are used, the effect of this embodiment can be obtained.

From the comparison between Examples 1 and 16, it is found that when the first heating temperature is lower, the clogging resistance is more superior.

The second heating temperature of Example 17 is low as compared to that of Example 2. When the second heating temperature (post-heating temperature) is low, the resin particles may be insufficiently melted in some cases, and the abrasion resistance may be degraded in some cases. However, from the result of Example 17, it is found that even when the second heating temperature is low, the image quality and the abrasion resistance of the recorded matter are not degraded by decreasing the glass transition temperature of the resin particles.

The second heating temperature of Example 18 is low as compared to that of Example 7. From the result of Example 18, it is found that in the case in which the glass transition temperature of the resin particles is high, when the second heating temperature is low, the abrasion resistance is degraded, and the cracking resistance is improved.

From the result of Example 19, it is found that even if the adhesion amount of the treatment liquid is decreased, the effect of this embodiment can also be obtained.

What is claimed is:

1. An ink jet recording method which performs recording on a recording medium using a white ink composition, a non-white ink composition, and a treatment liquid containing an aggregating agent, the method comprising:

a treatment liquid adhesion step of adhering the treatment liquid to the recording medium to form a treatment liquid layer;

a non-white ink adhesion step of adhering the non-white ink composition to the recording medium by ejection thereof from an ink jet head to form a non-white ink layer; and a white ink adhesion step of adhering the white ink composition to the recording medium by ejection thereof from an ink jet head to form a white ink layer, wherein the recording medium has a region in which the non-white ink layer, the white ink layer, and the treatment liquid layer are overlapped, at least one of the white ink composition and the non-white ink composition contains resin particles and a water-soluble resin, or one of the white ink combination and the non-white ink composition contains resin particles, and the other contains a water-soluble resin, the water-soluble resin has a glass transition temperature higher than that of a resin of the resin particles, the glass transition temperature of the water-soluble resin is in the range of 90 to 200° C., and the water-soluble resin is dissolved in a medium of the ink composition.

2. The ink jet recording method according to claim 1, wherein the white ink composition contains the resin particles and the water-soluble resin.

3. The ink jet recording method according to claim 1, wherein at least one of the white ink composition and the non-white ink composition contains the resin particles and the water-soluble resin, and a content of the resin particles in the ink composition is two times or more that of the water-soluble resin.

4. The ink jet recording method according to claim 1, wherein the water-soluble resin has a glass transition temperature higher than that of the resin of the resin particles by 10° C. to 100° C.

5. The ink jet recording method according to claim 1, wherein the water-soluble resin has a glass transition temperature of 90° C. or more, and the resin of the resin particles has a glass transition temperature of less than 90° C.

6. The ink jet recording method according to claim 1, wherein the resin of the resin particles includes an acrylic resin, and the water-soluble resin includes a urethane resin.

7. The ink jet recording method according to claim 1, wherein the non-white ink composition includes a clear ink composition, and the non-white ink adhesion step adheres the clear ink composition to the recording medium by ejection thereof from an ink jet head to form a clear ink layer.

8. The ink jet recording method according to claim 1, wherein the aggregating agent contained in the treatment liquid contains a polyvalent metal salt, an organic acid, or a cationic polymer.

9. The ink jet recording method according to claim 1, wherein in the non-white ink adhesion step or the white ink adhesion step, the recording medium has a surface temperature of 45° C. or less when the ink composition is adhered thereto.

10. The ink jet recording method according to claim 1, further comprising a post-heating step of, after the treatment liquid adhesion step, the non-white ink adhesion step, and the white ink adhesion step, heating the recording medium, wherein the recording medium has a surface temperature of 90° C. or less in the post-heating step.

11. The ink jet recording method according to claim 1, wherein the non-white ink composition includes a non-white color ink composition, and the non-white ink adhesion step adheres the non-white color ink composition to the recording medium by ejection thereof from an ink jet head to form a non-white color ink layer as the non-white ink layer.

12. The ink jet recording method according to claim 1, wherein the white ink adhesion step forms the white ink layer on the non-white ink layer formed by the non-white ink adhesion step.

13. An ink set which includes a white ink composition, a non-white ink composition, and a treatment liquid containing an aggregating agent and which is used for a recording method to be performed on a recording medium, the recording method comprising:
- a treatment liquid adhesion step of adhering the treatment liquid to the recording medium to form a treatment liquid layer;
- a non-white ink adhesion step of adhering the non-white ink composition to the recording medium by ejection thereof from an ink jet head to form a non-white ink layer; and
- a white ink adhesion step of adhering the white ink composition to the recording medium by ejection thereof from an ink jet head to form a white ink layer, wherein the recording medium has a region in which the non-white ink layer, the white ink layer, and the treatment liquid layer are overlapped, at least one of the white ink composition and the non-white ink composition contains resin particles and a water-soluble resin, or one of the white ink combination and the non-white ink composition contains resin particles, and the other contains a water-soluble resin, the water-soluble resin has a glass transition temperature higher than that of a resin of the resin particles, the glass transition temperature of the water-soluble resin is in the range of 90 to 200° C., and the water-soluble resin is dissolved in a medium of the ink composition.

* * * * *